United States Patent [19]
Garmendia

[11] Patent Number: 5,544,572
[45] Date of Patent: Aug. 13, 1996

[54] MACHINE FOR AUTOMATICALLY PREPARING AND DISPENSING FRUIT JUICE

[75] Inventor: Jose L. Garmendia, Guipuzcoa, Spain

[73] Assignee: Zumatu, S.A., Spain

[21] Appl. No.: 413,695

[22] Filed: Mar. 30, 1995

[30] Foreign Application Priority Data

Mar. 30, 1994 [ES] Spain ................................. 9400696

[51] Int. Cl.$^6$ ........................................................ A23N 1/00
[52] U.S. Cl. ............................... 99/489; 99/484; 99/492; 99/501; 99/504; 99/510; 99/517; 99/536
[58] Field of Search ........................... 99/495, 496, 517, 99/536, 501–510, 484, 485–492; 100/98 R, 116, 127, 213, 218

[56] References Cited

U.S. PATENT DOCUMENTS

| | | | |
|---|---|---|---|
| 4,738,194 | 4/1988 | Ando et al. | 99/484 |
| 4,886,574 | 12/1989 | Grant | 9/483 |
| 4,974,505 | 12/1990 | Torrisi | 99/502 |
| 5,249,516 | 10/1993 | Pastor | 99/504 |

Primary Examiner—Timothy F. Simone
Attorney, Agent, or Firm—Lucas & Just

[57] ABSTRACT

The machine provides fresh fruit juice by storing and squeezing pieces of fresh fruit. The machine is built with a compartmented cabinet frame that allows for a module construction, each module being removable to allow for easy maintenance and assembly. The various modules that are used to assemble the machine are a storage module for storing the fresh fruit pieces, a feed module which transfers the fresh fruit pieces from the storage module to a squeezing module. After squeezing the juice from the fresh fruit pieces in the squeezing module, the residue falls by gravity into a crushing module which crushes the residue and removes the crushed residue from the machine. The machine also has a refrigerating module to keep the fresh fruit cool and a programable control module to control the modules and the overall operation of the machine. The squeezing module has a rotary portioner which transfers the fresh fruit pieces from the feeding module to a cutting unit. The cutting unit cuts the pieces of fruit so they can be squeezed by the squeezing unit. The juice then flows into a tank. The tank is equipped with a level detector and an overflow device. The squeezer module also has an internal washing unit to wash the cutting unit, the squeezing unit and the tank.

26 Claims, 13 Drawing Sheets

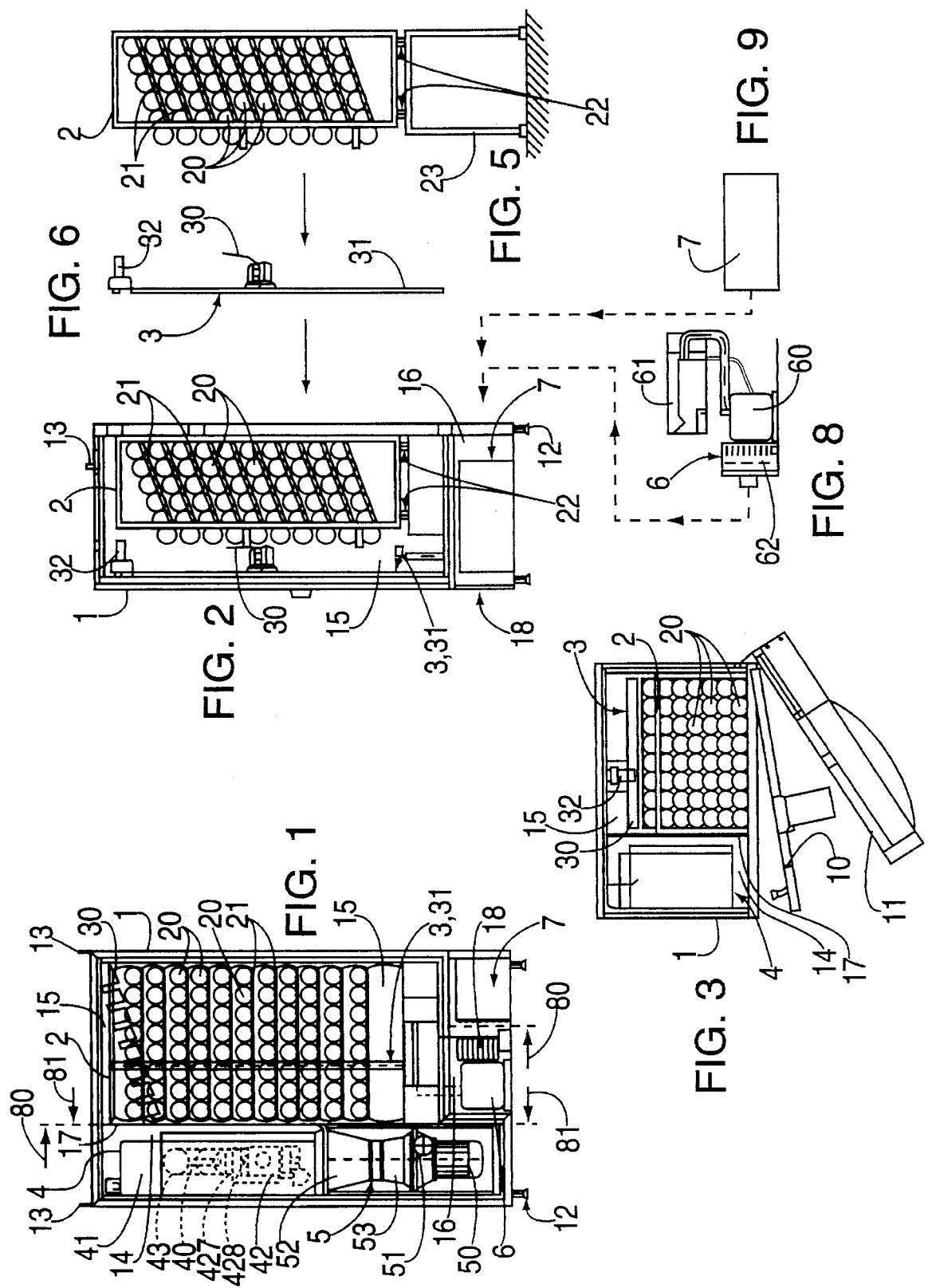

MACHINE FOR AUTOMATICALLY PREPARING AND DISPENSING FRUIT JUICE

BACKGROUND OF THE INVENTION

1. Field of the Invention

The object of the present invention relates to automatic machines which, operated by coins, tokens, cards, or the like, are capable of instantaneously preparing and dispending squeezed juices of fruits such as oranges and the like. For this purpose, these machines have a general construction which comprises means for the storing of the fruit; means for transferring the fruit to a squeezer group which, upstream of the squeezing means proper, has means for the cutting or sectioning of the pieces of fruit and subsequent means for the collecting and dispensing of the juice obtained, as well as for the disposal of the resultant solid residues (peels, rinds, seeds, etc.).

2. Description of the Prior Art

The machines which are presently known in this field are based on a rudimentary structural philosophy of incorporating the different parts by direct attachment to a frame which results in a complicated, time consuming construction which makes its mass-production difficult, is more expensive, and has a result that the maintenance work is also difficult, slow, and expensive.

On the other hand, instantaneous juice preparing machines are greatly appreciated since they make it possible to obtain freshly squeezed juice, that is to say juice in its best condition of nature and taste. However, this success in the definition of the object is substantially impaired by the imperfect healthfulness offered by the machines known up to now in this field, since their cleaning is difficult and therefore performed only randomly.

With reference to the transfer of the pieces of fruit (between the feeding means and the cutting means), in the known machines this takes place directly and exclusively by means of a descending ramp conduit, that is to say as the result of the mere action of gravity.

In these machines, there is also known the existence of portioning means intended to assure that the cutting means receive the pieces of fruit one by one. These means consist of a system of gates, the movement of which is fixed and rigidly synchronized with the actuation of the cutting means, which are of different and invariable length and generate a first compartment which is open at the front for the entrance of the cutting means, and a second compartment upstream from the former; all of this in such a manner that, in a part of the operating cycle of the machine, a piece of fruit passes through the upper gate and is retained at the lower gate (first compartment) in order, at a subsequent moment of the cycle, for said lower gate to be withdrawn and free access be granted to the cutting means.

This known device suffers from a lack of efficiency and reliability, since it is very sensitive to the difference in sizes of fruit, which may change the normal operation of the system of gates; and, since all movements are only caused by the mere passive action of gravity, there is a lack of control of the operating times, which may have the result that the piece of fruit does not reach the cutting means at the proper time with result that it is flattened by the mechanism or is cut into very unequal parts which cannot be treated suitably in the following squeezing operation, or even that the piece of fruit does not reach them at all and an empty working cycle thus results, and the user becomes impatient.

With respect to the feeder, it is known that the taking of the pieces of fruit is effected by means of a cup of inverted trapezoidal cross section which extends operatively along the first row of pieces of fruit arranged to be taken up, employing for this pairs of pins which can pass vertically between said pairs of pins of the trays while said cup is capable of turning transversely between an unturned position or position for the taking up of the pieces of fruit by said pairs of pins and another, turned, position in which the pieces of fruit occupy the bottom of the cup and in which the turning is produced passively by the mere action of gravity on the pieces of fruit, which has the result that they tend to roll towards the bottom of the cup while the ascending taking pins separate them from the bed of the tray containing them. It is also known for this tray to assume a longitudinally inclined position when it reaches the highest position of its path, which causes the pieces of fruit to roll and be delivered to the inlet of the squeezing means.

This known construction has various important drawbacks. The entrusting of the turning of the cup to the mere passive action of gravity offers little reliability or operational control since any foreseeable or accidental cause (dirt, local damage, etc.) may have the result that the proper actuation is not properly effected and then the continuing of the operation cycle constitutes a serious risk for the integrity of the machine. Moreover, the taking over of the oranges or other pieces of fruit by means of the pins does not provide sufficient efficacy and reliability since these pins have an ascending inclination towards the point and the pieces of fruit are of variable sizes, which may combine negatively so that pieces of fruit are not collected or are pierced. And, furthermore, in these known machines, the correct carrying out of the working cycle is based on infallibility, that is to say on the supposition that nothing is going to go wrong, since there are no control means for malfunctions or damage, which is a utopian hypothesis which constitutes a serious defect in itself and which implies a worsening of the above-mentioned defects with respect to the turning by the mere action of gravity and the use of pins for the taking over of the pieces of fruit and which, finally, is not in accord with the image of complete operational control which a machine operating without any intervention of the part of the user other than the introduction of a coin, token, card, or the like, must have.

In addition, it is known that the necessary vertical displacement of the inclinable and turnable cup is effected with respect to a guide column which has its vertical lateral edges as tracks on which there are coupled grooved wheels mounted on a support to which the cup itself is movably attached. This system is not considered suitable, since it is capable of producing a displacement of the cup with longitudinal pitch which will appear with use since it is sensitive to wear between wheels and tracks, and furthermore this system is prone to derailing which may have serious results for the integrity of the machine.

It has been stated above that the justification for these machines resides in the value and esteem for the consumer of obtaining a juice which is not only prepared with natural juice but also has been freshly squeezed.

In practice, this purpose is frustrated because the known machines serve portions of juice which customarily contain leftovers from previous squeezings. This results in a failure of the description 'freshly squeezed' which, on the one hand, impairs the taste, which as is known declines substantially with the time which elapses between the obtaining of the juice and its consumption; and which, on the other hand, has a negative effect on its healthfulness, since it undergoes very rapid processes of fermentation, even more so taking into account the heat liberated and accumulated within these machines. In this connection, it must be borne in mind that the time between successive servings by the machine, although variable, makes it necessary to assume that every day there will be, at least, a lapse of many hours corresponding to nighttime. As to the accumulation of heat within the machine, there is no refrigerating circuit to cool the region for the storage of the oranges; quite the contrary, since there is a large additional source of heat outside of this enclosure.

The entire problem results from the fact that, on the one hand, in these known machines, the necessary juice collecting tank is provided soleley with a level float which, when a given height is reached, stops the production of more juice and proceeds to serve the portion measured by the float; and, on the other hand, there are no timing mechanism which make it possible that the incoming juice is collected before it is served.

Therefore, the juice which, for one reason or another, remains in the tank after the serving of a portion, will be served together with the freshly squeezed juice thereby adulterating it.

Furthermore, the lack of said timing means also results in a lack of precision in the measuring of the portion received by the customer, since during the dispensing variable amounts of the oncoming juices may be included, which will depend on the moment of the squeezing operation that the order to stop is received. Furthermore, even if there were a timing means, it is not possible with this system to avoid that, before the serving, the level of the tank reach a value higher than that assigned to the mere action of the float; for example, if the float is very close to its assigned level and then the squeezing of a piece of fruit takes place, all of the juice thereof will be collected in the tank even though the float has already reached said stop level.

SUMMARY OF THE INVENTION

A object of the present invention is therefore to provide a machine as set out above which is of reliable operation, permits easy access to all parts thereof for cleaning and maintenance and wherein freshly squeezed juice without adulteration is provided in predetermined amounts.

This problem is solved by the invention namely A machine for automatically preparing and dispensing fruit juice from pieces of fruit stored within the machine, characterized in that the machine has a disassemblable modular construction comprising a compartmented supporting cabinet frame for removably supporting:

a storage module for pieces of fruit in their natural state;

a squeezer module comprising a cutting unit and a squeezing unit following by a juice tank;

a feed module for transferring the pieces of fruit to an inlet of said squeezer module;

a refrigerating module associated with the compartment occupied by said storage module; and an operational control module including a programmable controller for controlling the operation of the modules of the machine.

Advantages, developments and specific embodiments of the invention are disclosed in the following paragraphs.

The squeezer module is divided into an upper compartment which houses a motor for providing driving power to the squeezer module, and a lower squeezing compartment which houses the cutting unit, the squeezing unit and the juice tank are disposed one above the other.

The machine has an internal washing system for removing the residues of pulp and juice from the squeezing unit.

The machine has a rotary bucket carousel portioner for transferring the pieces of fruit one by one from the feed module to the cutting unit.

The juice tank is provided with a level measurement device and an overflow.

The cabinet frame is divided into:

a lateral compartment extending between the front and the rear of the cabinet, between any of the sides thereof and a separating partition wall and in which from the top to bottom the squeezer module and crusher module are removably located;

a refrigerating compartment extending in width between the partition wall and the other side of the cabinet, in height between the roof of the cabinet and the top of a third compartment, and in depth between the back of the cabinet and a corresponding inner insulating door which is covered by an outer door, the refrigerating compartment housing at the rear portion thereof, the feed module and the front portion thereof, the storage module which is directly accessible through said inner door; and a third machinery compartment provided with a rear ventilation grid and housing the refrigerating module and the program control module, the machinery compartment being located below said refrigerating compartment and adjacent the lateral vertical compartment.

The machine has removable tanks for collecting of the residue of the squeezed pieces of fruit, as well as tanks for storing of cleaning water and tanks for drinking water if the unit is to operate without supply connections to a water system.

The machine has a crusher module coupled to the base of the squeezer module for comminuting the solid residues of the squeezed pieces of fruit.

The internal washing system comprises a pair of showers which direct a stream of water downwards towards the squeezing means, and a hose connected directly to the inside of the juice tank and of dispensing means for the squeezed juice; the showers and hose being fed from a distributor which, in its turn, is supplied by an inlet connected to the general water supply network or, via a pressure pump, to an auxiliary tank on the inside or outside of the machine.

The crusher module comprises an upper hopper collecting by gravity the solid residues of the squeezed pieces of fruit; and a body having an outlet discharging the comminuted residues into the drain of the general sewage system.

The internal washing system is controlled by an operating routine of the control module including a programmable controller such that it is activated automatically within the operating cycle of the machine or manually, when desired, except during the squeezing process. The operating routine, in the presence of a self-cleaning instruction opens a water inlet and a juice-dispensing solenoid valve, temporarily activates the squeezing means, closes the water inlet and, moments later, closes the solenoid valve.

The crusher module is controlled by an operating routine of the control module which activates the motor of the crusher module at the same time as it activates the motor of the squeezer module and which opens a water inlet of the crusher module itself, closes the inlet and stops the motor of the crusher module with a sufficient delay as compared with the stopping of the squeezer group in order that the crushed material amply reaches the liquid stream of the general sewage system.

The rotary carousel portioner comprises a multi-bucket wheel or carousel which, placing one of its cells rotatably connecting the outlet of a chute for access of the pieces of fruit with the inlet of the cutting receptacle for their subsequent squeezing, has its horizontal shaft provided integrally with a turnstile, the vanes of which are in number and angular shift identical to the buckets, one of the vanes always interfering tangentially at the initial point of the active section of the ascending path of normal active horizontal position of a displaceable pallet which has its movement synchronized with the operating cycle of the machine, which pallet is rotatably mounted with respect to a horizontal shaft and has means for its selective inhibiting of operation.

The selective inhibiting means of the actuating pallet is accomplished by the horizontal rotary shaft of said pallet being blocked by an electromagnet in an oblique turned or inhibited position in which the active edge of the pallet leaves the vertical strip of interference with said active vane of the turnstile, while near the lower end of the operating path of the pallet there is a static stop which interacts with the pallet, producing the inhibited oblique turned position.

For the selective blocking activation, the electromagnet is electrically integrated in an operational control system including the programmable controller which sends a blocking order whenever, at the lower point of the operating path of the pallet, a microswitch or 'micro' is actuated a predetermined number of times by an actuating angle bar the movement of which is synchronized with the translation of the support of the pallet.

In correspondence with its operating stations, the rotary shaft of the bucket wheel has notches which partially receive a ball biased by a spring which at its other rear end is applied against the end of a threaded rod which is screwed into a nut fastened to the anchorage which supports the bucket wheel.

At the entrance of the chute there is disposed a presence of pieces of fruit' sensor which, upon detecting the absence of pieces of fruit just in front of said inlet, produces a signal which, processed by said control module, will give rise to an instruction for the carrying out of a new supply operation, while pieces of fruit are still present on said chute awaiting portioning and squeezing.

The feed module has an inclinable and turnable cup, the active edge of which receives the pieces of fruit, having a crenelated configuration forming receiving scoops which on their front and edge have a rotary roller installed and which are of a width somewhat less than the separation between each pair of pins which retain the first piece of fruit of descending alignments of pieces of fruit arranged in superimposed trays of a multi-level storage module which are inclined downwards towards the path of the cup, while the feed module has associated sensor and actuator means which are adapted to be connected to the control module governing the entire operation with the exception of the inclining and turning up of the inclinable and turnable cup, the sensor and actuator means comprises:

a first sensor on each of said receiving scoops, which can be actuated by the passage of the pieces of fruit;

a first electromagnet for turning the cup, which can be activated by the actuated condition of said first sensor;

a second sensor which senses the turned state of the cup;

a second electromagnet which determines and blocks the horizontal position of the cup;

a third sensor which activates on the second electromagnet the unblocking state of the horizontal position of the cup;

a fourth sensor for the 'cup up' position;

a fifth sensor for the 'cup down' position;

a sixth sensor which, within a timed period of time prior to the start of the ascending path examines whether any piece of fruit from the preceding operating cycle is caught in the cup;

a seventh sensor which activates the turning electromagnet when, in its turn, it is actuated by the activated state of the sixth sensor; and an eighth sensor which is located in operating correspondence with the lower end of the inclined 'cup up' position.

In the feed module the means producing the inclination of the cup at the highest point of its ascending path are mechanical means comprising, at the movable part of the cup and protruding on the bottom and rear thereof, a stop member which in its vertical ascent interacts with another stop member anchored on the static cabinet frame of the machine prior to the time that the cup reaches said maximum point.

In the feed module the means for turning the cup upwardly are mechanical means consisting of a stop member which is fastened to the cabinet frame and which interacts when the cup reaches the lower dead center of its vertical operating run.

The feed module comprises a guide column formed by means of a rim which is fastened in disassemblable manner to the cabinet frame and which is provided with two parallel rails with circular heads which are operatively surrounded by corresponding, reciprocal grooves provided in a shoe associated with the carriage which bears said inclinable and turnable cup.

The juice tank comprises a collecting tank which is preceded by a filtering grid and followed by a dispensing solenoid valve, and is provided with an overflow which operates in combination with a corresponding float which measures the level of the juice collected, said overflow and float being adjustable.

In combination with the overflow, level float and solenoid valve, there is a selector of the total number of pieces of fruit calculated for a portion, as well as an operating routine which is governed by the control module, which, a short time after said programmed pieces of fruit have been squeezed, verifies whether the measure given by the float is that required for the portion established, giving an opening instruction to the solenoid valve if such is the case or an instruction for an additional piece of fruit to be squeezed if it is not the case, any excesses in level being automatically evacuated by the overflow.

The overflow has means for regulating the entrance level in operation.

The overflow is formed by a tubular segment which is threaded on its outside surface and which is screwed in selectively variable manner through the wall of the bottom of the collecting tank and with respect to a fixed nut.

The machine according to the present invention has a disassemblable modular construction formed of a compartmented load-bearing cabinet frame housing in extractable manner: a storage module for the pieces of fruit in their natural state; a feed module which transfers the pieces of fruit in elevation up to the inlet to the squeezer module in the upper part of the squeezing compartment; a squeezer module divided into an upper compartment for the motor, and a lower squeezing compartment, a refrigerating module associated with the compartment occupied by said storage module, and a module for operational control by the programmable controller.

The corresponding cutting unit of the squeezer module for the pieces of fruit is preferably preceded by a rotary bucket carousel portioner which transfers the pieces of fruit one by one from said feed module to said cutting unit, while the corresponding squeezing unit is followed by a juice tank with level measurer and overflow.

Preferably, a crushing module for crushing the residues left on the squeezing operation is coupled to the base of said squeezing module.

Further, there is preferably an inlet and distribution of water from an internal system for the washing of residues of pulp and juice from the cutting unit, the squeezing unit and the crushing module, if any.

The construction of the machine of the present invention is based on removeable and replaceable functional modules so that cleaning, maintenance, technical assistance and repair work is of great simplicity and rapidity, since the modular nature and the possibility of complete independent extraction of each module facilitate and shorten the cleaning of all modules and the location of what is wrong the case of problems, so that long periods of placing the machine out of operation are avoided since individual modules even may be replaced by spare modules since individual modules even may be replaced by spare modules if the problem cannot be solved on the spot.

This modular construction philosophy facilitates mass production, which is considerably cheaper, in the same way as assembly based on modules is simpler and faster, which also means a considerable saving in cost.

At the same time, this new modular construction facilitates the storage and the handling and transportation of the machines constructed since, when being serviced, the cabinet can be removed on one side and each module on its side; instead of having to service the machine completely assembled, as is the case at the present time.

Nor must the fact be overlooked that this streamlined construction results in a better product image, which will make it possible to sell more machines and even at a better price or at a higher profit.

In accordance with a preferred embodiment of the invention, the said cabinet frame is divided into three compartments: a first lateral compartment which extends between the front and the rear of the cabinet between one of the sides thereof and a partition wall and in which there are located in removeable manner, from top to bottom, said squeezer and crusher modules; a second refrigerating compartment which extends in width between said partition wall and the other side of the cabinet, in height between the roof of the cabinet and that of a third compartment, and in depth between the back of the compartment and a corresponding inner or second insulating door over which the corresponding outer door is applied, the refrigerating compartment housing at its rear portion said feed module and at the front region said storage module, and being directly accessible through said inner door; and a third machinery compartment, provided with a back ventilation grid and housing said refrigerating means and programmed controller module, which are located under said refrigerating compartment and on the back of said first lateral-vertical compartment. In the optional case that said crushing module is not present, its place will be taken, also in removable manner, by tanks for collecting the residues of the squeezed pieces of fruit, which tanks can be replaced by other empty ones.

Furthermore, the invention preferably includes self-cleaning means consisting of a pair of showers or nozzles which can be oriented downwards towards said deflector and squeezing means, and of a hose connected directly to the inside of said collecting and dispensing means; which showers and hose are fed from a distributor which, in its turn, is provided with an inlet connected to the general water supply system or, via a pressure pump, to an auxiliary tank on the inside or outside of the machine.

For their greater efficiency, these self-cleaning means have associated with them an operating routine which is governed by a module for control by programmable controller and which is automatically activated within the operating cycle of the machine, or manually when so desired, except within the squeezing process; which operating routine, upon a self-cleaning instruction or command opens the water inlet and the fruit dispensing solenoid valve, temporarily activates the squeezing means, closes the water inlet and, a few moments later, closes this solenoid valve. This delay in closing of the solenoid valve assures the perfect evacuation of the wash water.

Finally, this new self-cleaning system makes it possible to carry out, after each established time cycle, a perfect washing of the squeezing means and of the juice receiving and evacuating means; or else the maintenance operator of the machine may himself manually order a self-cleaning cycle. In this way, the perfect healthfulness and unaltered flavor of the juice obtained is guaranteed.

As indicated above, according to a preferred embodiment, the machine is provided with a crushing module which in its upper hopper collects by gravity the solid residues of the squeezed pieces of fruit from said squeezing module, comminutes them in the crusher body and at its outlet discharges them into the drain of the general sewage system.

In order to obtain greater operative efficiency, there is associated with said crusher an operating routine which is controlled by said controller module and which activates the motor of the crusher at the time that it activates the motor of the squeezer group and which opens the water inlet of the crusher itself, closing this inlet and stopping the motor of the crusher with sufficient time delay with respect to the stopping of the squeezer group so that the crushed product fully reaches sufficiently the liquid stream of the general sewage system.

With respect to the new fruit portioning device which is recommended for juice-preparing machines, it has a special construction consisting of a multi-bucket wheel or carousel which, locating one of its buckets rotatably connecting the outlet of an access chute for the pieces of fruit with the entrance of the cutting receptable for their subsequent squeezing; this bucket wheel has its horizontal shaft provided rigidly with a turnstile the vanes of which are equal in number and angular spacing to that of said buckets, one of said vanes at all times interfering tangentially with the initial point of the active section of the ascending track, from the normal active horizontal position of a displaceable pallet which has its movement synchronized with the operating cycle of the machine, which pallet is mounted for rotation with respect to a horizontal shaft has means for its selective stopping of operation.

In contrast to portioning based on the passive action of gravity employed by the machines known up to the present time, in the new portioner the proposed serving or the pieces of fruit one by one is effected actively and at precise moments, so that it is more effective and reliable and collaborates in the obtaining of a shorter time cycle, always in the same duration, which favours a good image of the machine on the market and therefore its easier and better sale.

Said means for the selective stopping of the actuating pallet consists in that said horizontal rotary shaft of this pallet can be blocked by an electromagnet in an oblique or inhibited turned position in which the leading edge of the pallet leaves the vertical edge of interference with said active vane of the turnstile, while near the lower end of the operating path of the pallet there is a static stop which interacts with this pallet producing said inhibited oblique turned position. This inibited position is used in order not to supply a new piece of fruit when the ones contemplated have already been squeezed and to carry out in an empty ascending/descending path-empty, which permits the correct evacuation of the residues produced. For this purpose, for its selective blocking activation, this electromagnet is electrically integrated in an operational control system by the programmable controller which sends a blocking order whenever, at the lower point of the operating path of the pallet, a microswitch or 'micro' is actuated a predetermined number of times by an actuating angle bar which has its movement synchronized with the translation of the support of the pallet.

In accordance with another feature of the invention, corresponding to its operative stations, said rotary axis of the bucket wheel has corresponding notches which partially receive a ball biased by a spring which on its other end, its rear end, is applied against the tip of a rod which is threaded in a nut fastened to the anchorage itself which supports the bucket wheel. This makes it possible to determine a certain locking of any operating position of the portioning bucket wheel, which avoids changes in this operating position, while it can easily be overcome by the rotary actuation produced by the pallet.

Furthermore, at the inlet of said chute there is provided a 'presence of pieces of fruit' sensor which, when detecting a lack of pieces of fruit just in front of such inlet, produces a signal which, when processed by said control system, will result in an instruction for performing a new supply operation, while pieces of fruit are still present in said shute awaiting portioning and squeezing. In this way, there is obtained a continuity in the operation of the machine without any waiting time.

The feed module preferably comprises a inclinable and turnable cup, the active edge of which receiving the pieces of fruit having a crenelated configuration which determines receiving scoops which at their front end edge have a rotary roller installed and which are of a width somewhat less than said separation between the retaining pins of each pair of said supply trays. The feed module has associated with it sensor and actuating means which can be connected to the programmable controller control module system which controls the entire operation with the exception of the inclining and turning of the inclinable and turnable cup. These sensor means and actuating means comprise: a first sensor in each said receiving scoop which can be actuated by the passage of the piece of fruit; a first electromagnet for the turning of said cup which is activatable by the actuated condition of said first sensor; a second sensor which senses the turned cup state; a second electromagnet which determines and blocks the horizontal position of the cup: a third sensor which on said second electromagnet activates the stage of unblocking of the horizontal position of the cup; a fourth position of the 'tray up' position; a fifth sensor of the 'tray down' position; a sixth sensor which, with a time delay before the commencement of the ascending path, examines whether any juice or fruit of the previous work cycle remains stuck in the cup; a seventh sensor which activates said turning electromagnet when, in its turn, it is actuated by the activated state of said sixth sensor; and an eighth sensor located in operating correspondence with the lowest end of the inclined 'cup up' position.

Summarizing, the special advantageous features which immediately become evident from this new construction reside therein that now the turning of the cup does not depend on the mere force of gravity but is produced actively, in controlled manner, by said first electromagnet, which results in greater efficiency and reliability; the taking over of the pieces of fruit is not effected by means of pins, but by scoops which, in addition, have at their tip or inlet, a rotary roller which faciliates the taking on of the pieces of fruit, all of which results in a more reliable operation which better guarantees minimum and limited duration of the operation, favoring the automatic nature of an operating sequence in a minimum time for the working cycle; there are means which automatically provide complete operating control, with the establishment of self-correcting routines for possible malfunctions.

In accordance with another advantageous feature of the invention, the feed module comprising a guide column formed by a rim fastened removable on the cabinet-frame and which is provided with a piar of rails with a circular heads which are operatively surrounded by corresponding reciprocal grooves provided in a shoe associated with the carriage bearing said inclinable and turnable cup; this provides a softer and more precise displacement of the inclinable and turnable cup, without longitudinal pitching and without the possibility of fatal derailments.

With respect to the new portioning device for the squeezed juice, the collecting tank is provided with an overflow which operates in connection with a corresponding float which measures the level of the juice collected.

Furthermore, in accordance with the invention, together with said overflow, level float and solenoid valve, there is a selector for the total number of pieces of fruit calculated for one portion, as well as an operating routine which is govered by the programmable controller and which, a short time after said programmed pieces of fruit have been squeezed, verifies whether the measurement given by the float is that required for the portion established, it giving an instruction for the opening of the solenoid valve if that be the case, or an instruction for the squeezing of an additional piece of fruit if that is not the case, and always with the assurance that the excesses in level are automatically evacuated by the overflow.

Summarizing, the advantage of applying this new recommended device resides, on the one hand, in the fact that after each serving, the tank is absolutely empty of juice, and, therefore, the entire volume of juice of a portion served is always freshly squeezed juice and only fresh squeezed juice; and, on the other hand, by the fact that the measurement of the portion is now of great precision. All of this, due to the fact that the time delay in the taking of the measurement of the level by the float gives rise to the fact that the excess is evaluated via the overflow and that all the juice on its way has been collected before ordering the serving of the portion.

Another feature of the invention consists therein that said overflow has means for adjusting the inlet level in operation, a preferred construction of this overflow consisting in a tubular segment which is threaded on the outside and which srews in selectively variable manner through the wall of the bottom of the collecting tank and with respect to a stationary nut.

BRIEF DESCRIPTION OF THE DRAWINGS

A preferred embodiment of the machine according to the present invention which merely is an illustrative example and is not limitative, will be described with reference to the drawings, wherein:

FIG. 1 is a front elevation of the embodiment of the machine in accordance with the invention and which is shown with out the inner door 10 and outer door 11 of the cabinet frame 1.

FIG. 2 is a corresponding cross-sectional side view along the line 80 in FIG. 1.

FIG. 3 is a top view corresponding to FIG. 1, shown without the roof of the cabinet frame 1, but which, on the other hand, shows its inner door 10 and outer door 11 open at different angles.

FIG. 5 is a side view in elevation of the storage module 2 resting on an auxilliary carriage 23 and in position to follow the indication of the arrow in order to be introduced into its position in the cabinet-frame 1, as illustrated in FIG. 2.

FIG. 6 shows a side elevation of the feed module 3 by itself, in position to be placed on the back wall of the cabinet-frame 1, as shown in FIG. 2, and before insertion of the storage module 2.

FIG. 8 shows, by itself, the refrigerating module 6 and the indication for its operative insertion into the cabinet-frame 1.

FIG. 9 represents diagrammatically the control module 7 by itself, with indication of the place of its operative insertion in the cabinet-frame 1.

In FIG. 12, the squeezing of both halves of a piece of fruit 20 is being effected. In FIG. 13, there can already be noted the expressed juice and the waste (peels) which are being dropped. In FIG. 14 the waste has already dropped towards the collecting hopper 52 of the crusher module 5. In FIG. 15 the bowls 430 are recovering the position to receive two new halves of another piece of fruit 20, assisted by the interaction of their rotation against the turner stops 432.

FIG. 18 shows the actuation of the stopper 415 before commencement of an ascending path which operatively actuates the turnstile 404, turning it (FIG. 19) up to its final portioning position (FIG. 20), or before empty ascending and descending paths are initiated, that is to say without acting on the turnstile 404 (FIG. 21).

Figure 7:
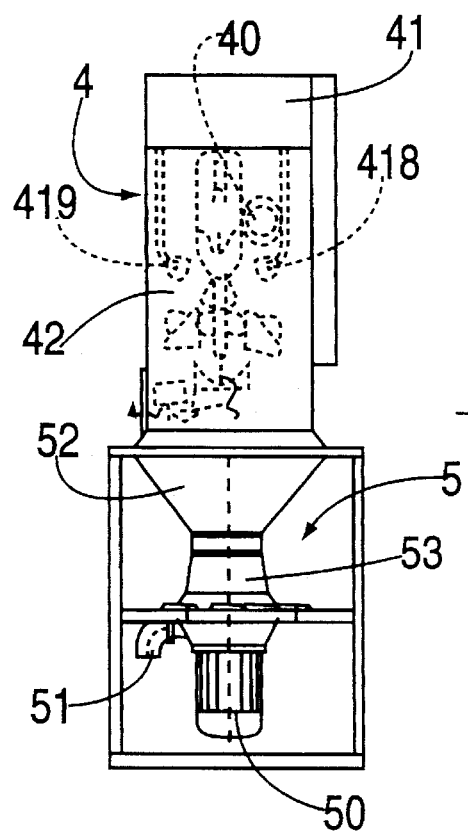
FIG. 7 shows, in side elevation, the assembly of squeezer module 4 and crusher module 5 in position to follow the indication of the arrow and to be installed operatively in the cabinet-frame 1, as it appears in FIG. 4.
Figure 4:
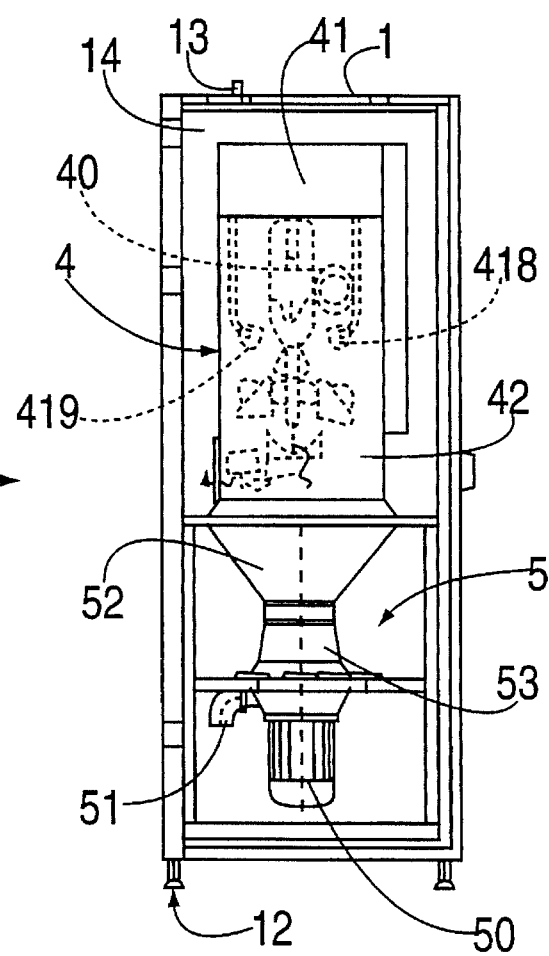
FIG. 4 is a side elevation which corresponds to the cross section along the line 81 of FIG. 1.

In these figures, the following reference numerals are used:

1. Cabinet frame
2. Storage module
3. Feed module
4. Squeezer module, with carousel portioner 40
5. Crushing module
6. Refrigerating module
7. Control module
10. Inner door of cabinet 1
11. Outer door of cabinet 1
12. Feet of cabinet 1
13. Eyebolts of cabinet 1
14. Vertical side compartment of cabinet 1
15. Refrigerating compartment of cabinet 1
16. Machinery compartment of cabinet 1
17. Partition
18. Ventilation grid
20. Pieces of fruit
21. Trays of storage module 2
22. Wheels of storage module 2
23. Auxiliary carriage
24. Tray retainer pins
30. Inclinable and turnable cup
31. Guide column
32. Motor for driving of feeder 3
33. Receiving scoops of cup 30
34. Front rotary roller of scoops 13
35. First sensor on scoops 33
36. Moveable incliner stop
37. First or 'turner of cup 30' electromagnet
38. Second electromagnet or 'horizontal blocking of cup 30'
39. Second sensor or 'cup 30 turned' sensor
40. Carousel or rotary portioner
41. Motor compartment of squeezer module 4
42. Squeezing compartment of squeezer module 4
43. Chute for access to portioner 40
44. Motor of squeezer module 4
45. Transmission belt
50. Motor of crusher module 5
51. Outlet of crusher module 5
52. Receiving hopper of crusher module 5
53. Crushing body of crusher module 5
60. Motor of refrigerator 6
61. Evaporator of refrigerator 6
62. Condenser of refrigerator 6
80. Indication of section 81. Indication of section
82. Enlarged detail
83. Indication of section
84. Enlarged detail
85. Indication of section
301. Fixed incliner stop
302. Fixed turner stop
304. Third sensor or sensor for 'unblocking the turning of the cup 30'
305. Fourth sensor or 'cup 30 up' sensor
306. Fifth sensor or 'cup 30 down' sensor
307. Sixth sensor or 'jammed piece of fruit 20' sensor
308. Seventh sensor or 'cup 30 preturning' sensor
309. Eighth sensor or 'presence of piece of fruit 20' sensor
310. Rim of column guide 31
311. Rails
312. Shoe
313. Carriage bearing the cup 30
401. Bucket wheel or carousel
402. Buckets of bucket wheel 401
403. Shaft of bucket wheel 401
404. Turnstile for driving the bucket wheel 401
405. Anchoring of bucket wheel 401
406. Locking notches of shaft 403
407. Locking ball
408. Drive spring
409. Threaded rod
410. Nut
411. Electromagnet
412. Actuating pallet
413. Movable support of electromagnet 411
414. Vertically displaceable carriage
415. Static lower stop
416. Counting microswitch or 'micro'
417. Actuating angle bar of microswitch 416
418. First wash shower
419. Second wash shower
420. Cleaning water inlet
421. Cleaning water distributor
422. First conduit for shower 418
423. Second conduit for shower 419
424. Third conduit or hose for juice tank 440
425. Cutting funnel
426. Presser
427. Knife
428. Deflector
429. Squeezer heads
430. Presser bowls
431. Anchoring rings of bowls 430
432. Turner stops of bowls 430
433. Worm shaft actuation of rings 431
437. Lower connecting rods
438. Upper connecting rods
439. Filtering grid
440. Juice tank
443. Juice dispensing solenoid valve
444. Scraping brush for grid 439
445. Actuating cam of brush 444
446. Float of tank 440
447. Overflow of tank 440
448. Fixed nut

DESCRIPTION OF A PREFERRED EMBODIMENT

Referring to the drawing and the reference numerals, the accompanying drawing show a preferred embodiment of the machine for the preparation and dispensing of the squeezed juice of oranges or other similar fruits.

Basically, this machine consists of a cabinet frame 1 which is especially designed to receive a number of separately constructed modules the operative interconnection of which permits the machine to operate independently and automatically, carrying out complete work cycles each time that it is requested to do so and that it has a load of fruit.

The cabinet frame 1 is divided on the inside, forming the lateral vertical compartment 14 which is separated by means of the partition wall 17 from the remaining space of the cabinet frame 1, which, in its turn, is divided horizontally into a comparatively large refrigerating compartment 15 located over a comparatively small machinery compartment 16. In the lateral compartment 14, there is located the group of the squeezer module 4 (top) and crusher module 5 (bottom) in the manner shown in FIGS. 1, 3, 4, and 7, it being provided that the crusher module 5 can be replaced under similar conditions by waste-collection pails for those cases in which the machine cannot be installed with a connection to a water inlet and corresponding drain. In the squeezer module 4 there is provided an upper compartment 41 which contains the motor proper and the water inlet and its distribution towards the showers or nozzles and inlets of the internal cleaning system, and a lower compartment 42 which has a carousel portioner 40 for the supplying of pieces of fruit 20 one by one and in which the cutting, squeezing and collecting of the juice takes place as well as the release of the waste which enters into the crusher module 5 for the crushing thereof and subsequent discharge to the drain through the outlet 51. In the refrigerating compartment 15 there are located the storage module 2 for pieces of fruit 20 and the module for the transfer of these pieces 20 to the upper entrance of said squeezing compartment 41 by means of the cup 30, through said partition wall 17, all of this as shown in FIGS. 1, 2, 3, 5 and 6. In order to maintain a low temperature, this refrigerating compartment 15 has an inner door 10 in front of the outer door 11 of the machine, In the machinery compartment 16 there are located the refrigerating module 6 and the programmable controller functional control module 7, as shown in FIGS. 1, 2, 8 and 9. The cabinet frame 1 may have the customary adjustable feet 12 for its support and the corresponding suspension eyebolts 13 for the handling thereof.

The figures of the drawing clearly show the great accessibility of each and all of the modules, the rational structure, the ease of maintenance and, in short, all advantages already enumerated above.

Figure 13:
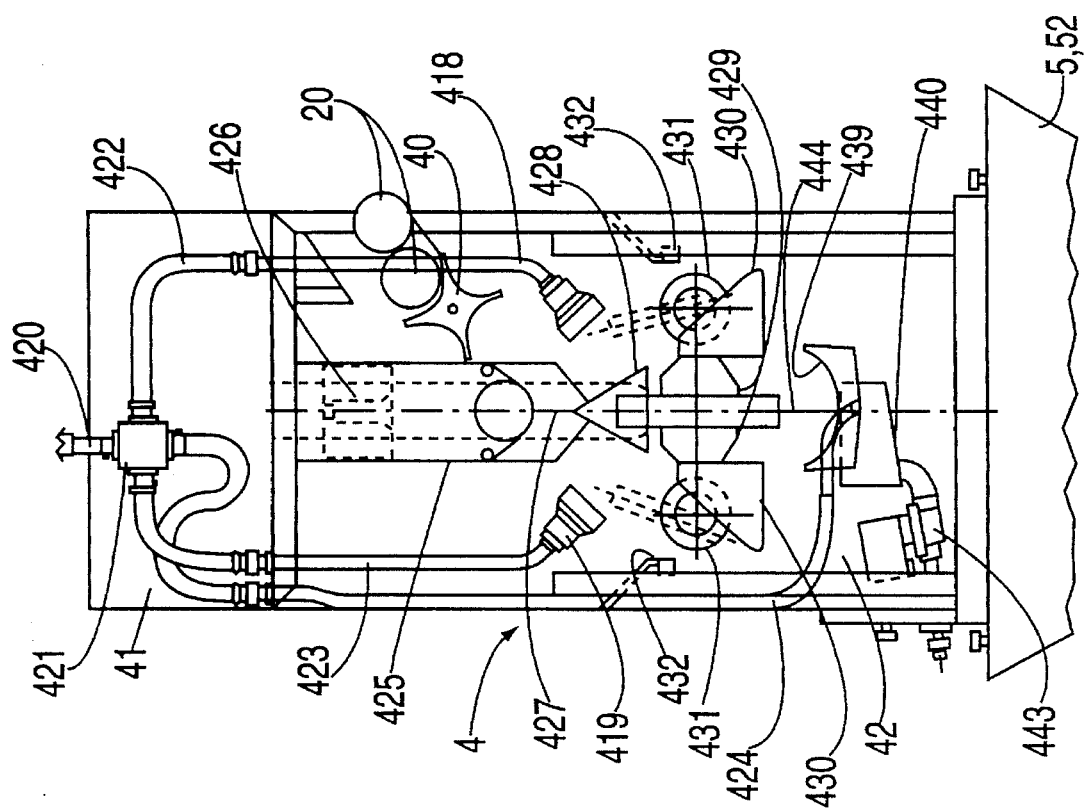
FIGS. 12 to 15 are diagrammatic views similar to FIG. 10 illustrating the sequence of the squeezing cycle.
Figure 12:
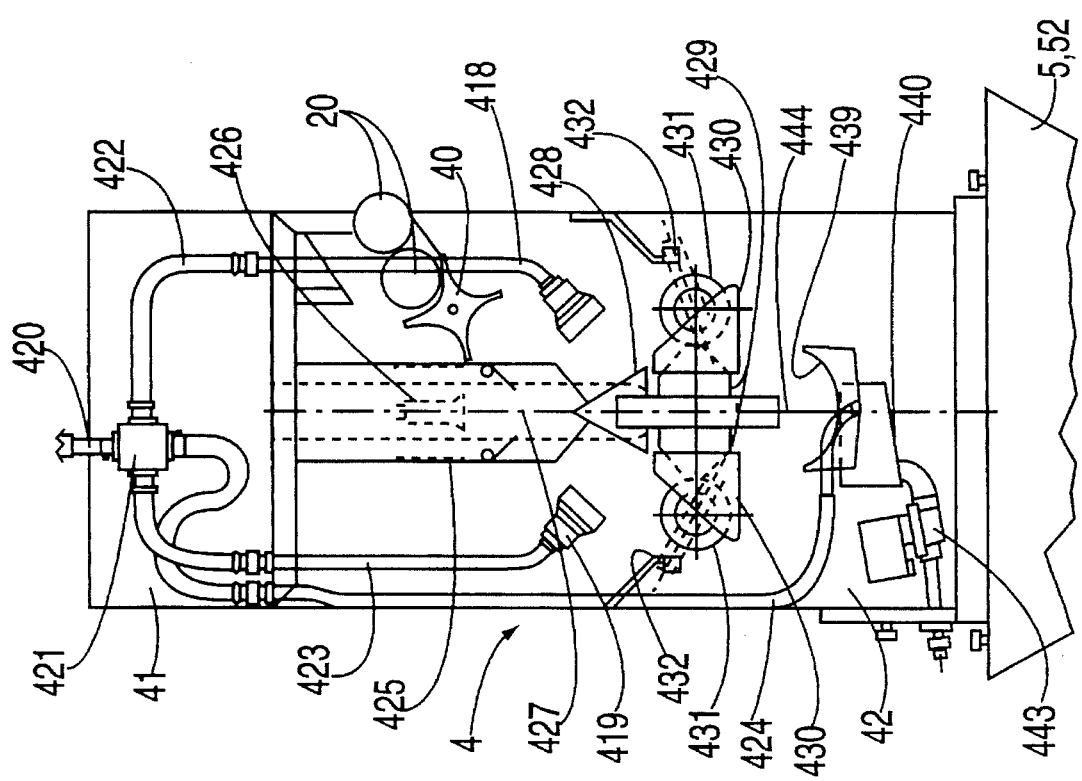
Figure 15:
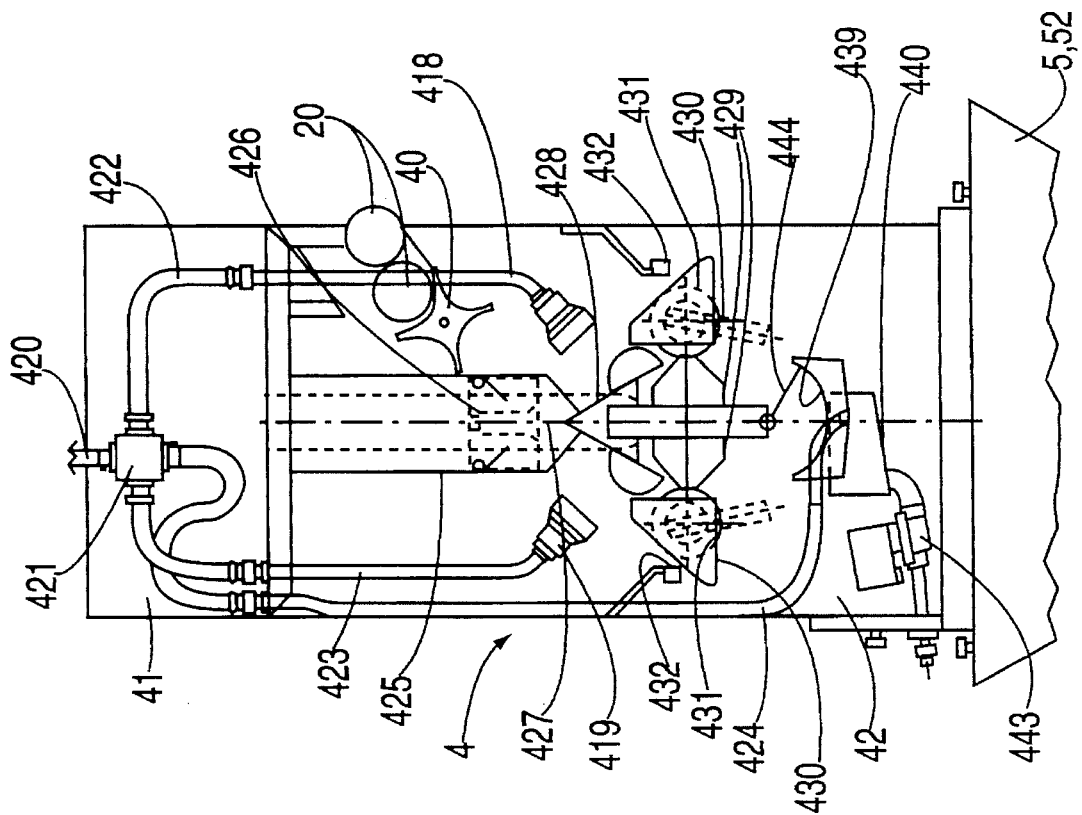
Figure 14:
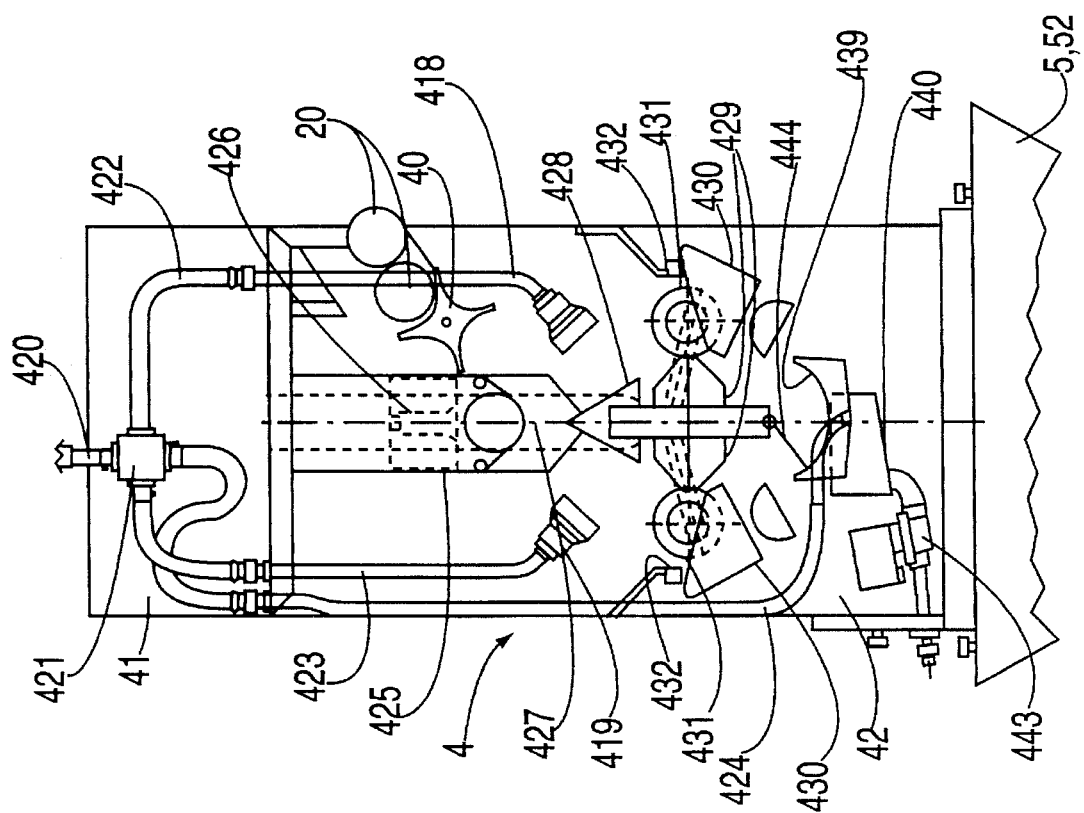
Figure 17:
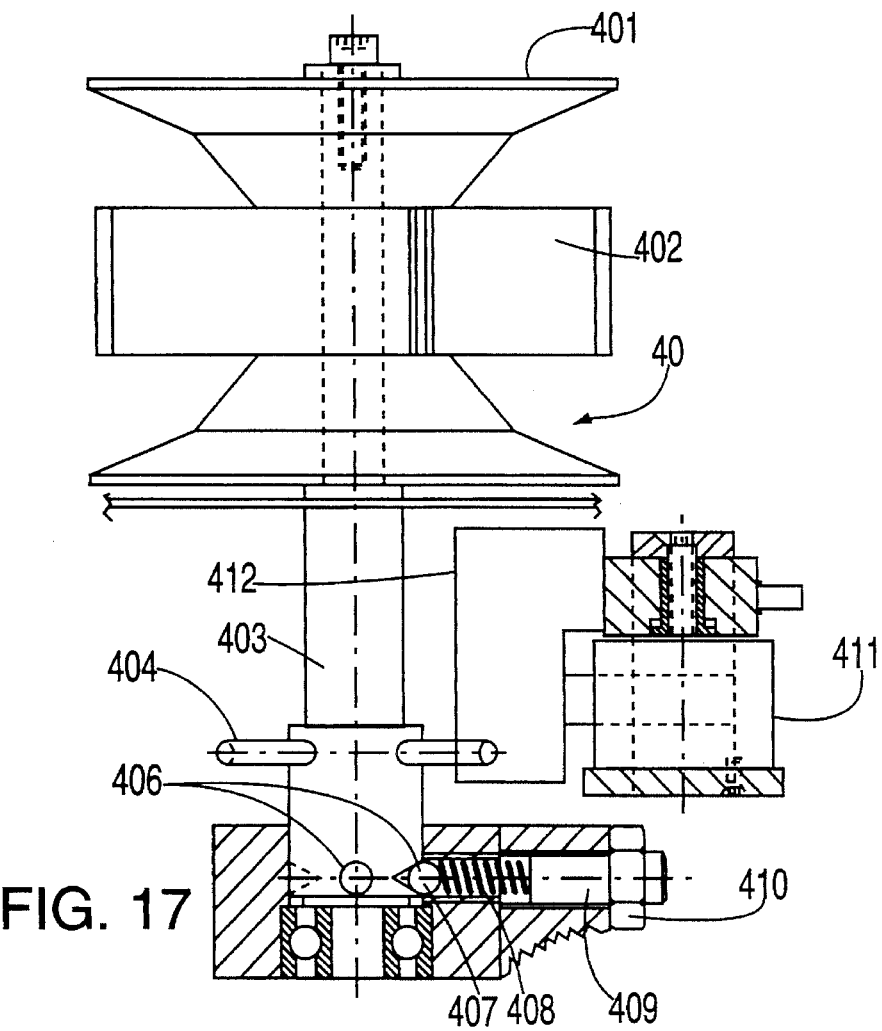
FIG. 17 is the lower plan view corresponding to FIG. 16, and in it there appear partial sections which concern the angular locking means of the shaft 403 and the electromagnet 411; the front and rear parts of the bucket wheel 401 are also shown in conventional section in order to note directly a bucket 402 and the end of a vane of the turnstile 404.
Figure 16:
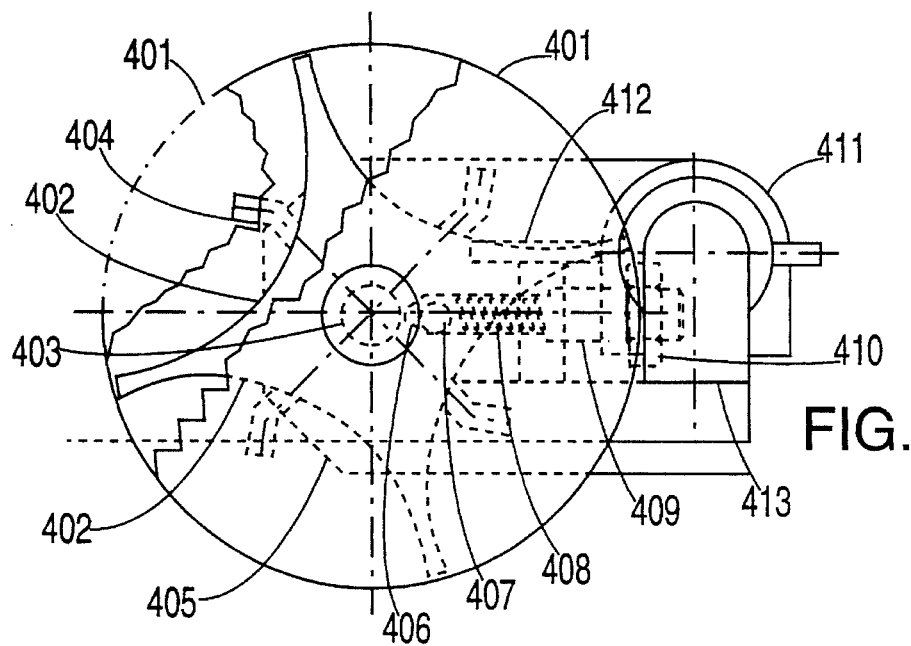
FIG. 16 shows, on a larger scale, the portioner 40 and its rotary actuating means, all as appears in FIG. 10.

The generic construction, as already known, of the squeezer group comprises (FIGS. 10 to 15) a cutting funnel 425 which receives the pieces of fruit 20 one by one from said portioner 40 and which, by means of the presser 426 and the knife 427, cuts them and, by means of the deflector 428, places the two halves in such a manner that (FIG. 15) they are taken up by the bowls 430 which, upon the advance of the rings 431, squeezes these halves (FIG. 12) against the rotary heads 429. Thereafter (FIG. 13 and 14), these halves which have already been squeezed drop into the collecting hopper 52 of the crusher module 5 and then, before a new receipt of two other halves, a cleaning operation of the filtering grid 439 is effected by the brush 444, by acting on the cam 445 thereof. This entire unit is housed in the squeezer module compartment 42, while the motor compartment 41 contains the motor 44, which, by means of the belt 45 and the worm shaft 433 actuates the rings 431 bearing the bowls 430 which rings, in their turn, by means of the pairs of lower connecting rods and upper connecting rods 437, 438 effect in synchronism the actuation of the cutting presser 426.

In accordance with the invention, the squeezer module 4 is provided with shower or nozzles 418 and 419 which produce a pressure watering of the deflector 428, the squeezer bowls 429, the presser bowls 430, and the filtering grid 439 (cooperating with the action of the brush 444). Furthermore, the inside of the juice tank 440 is washed by the hose 424. This hose 424 and the conduits 422 and 423 of said showers 418 and 419 are fed by the distributor 421 which, by means of the inlet 420, receives the water from the general supply system or from a pressure pump arranged at the outlet of an inner or outer auxilliary tank. When the instruction to clean arrives, the water passage to the showers 418, 419 and the hose 424 is opened, the solenoid valve 443 for the discharge of juice opens, the squeezing system turns a certain number of times and stops, the entrance of the water is shut off and, a few minutes later, said solenoid valve 443 closes, the result being thus obtained that all the parts mentioned are already perfectly clean and that all the cleaning water has been evacuated. The cleaning instruction is automatically given by the control module 7 after each cycle of prefixed time, but it can also be ordered manually by the operator upon maintenance; in the event, the instruction cannot be carried out during the squeezing cycle.

Attached to the base of the squeezer module 4, there is present a collecting hopper 52 of the crusher module 5 which, in the crusher body 53, crushes the solid waste coming from the squeezing and expels it through the outlet 51 into the general sewage network since the crusher module 5 must obviously be connected to the general water inlet and to the sewage system. The crusher module 5 is placed in operation together with the motor 44 of the squeezer module 4 and the admission of the water then starts, but both the crusher module 5 and the admission of water stop with the delay as compared with the stopping of the squeezer module 4, the result being thus obtained that the waste is eliminated much beyond the outlet 51.

Figure 10:
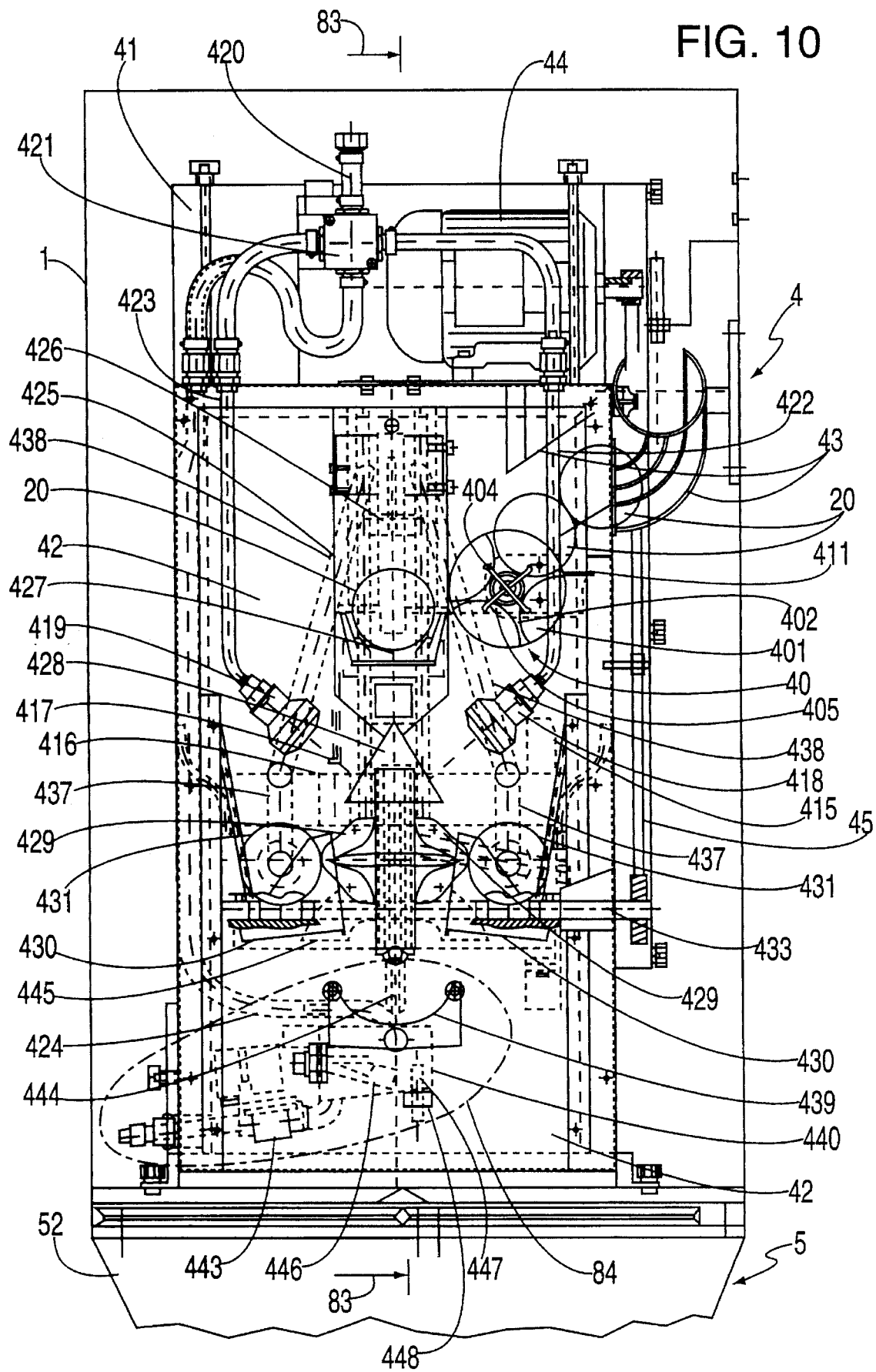
FIG. 10 shows the inside of the squeezer module 4, seen from the front in FIG. 4, and showing the beginning end of the hopper 52 of the crusher module 5.
Figure 11:
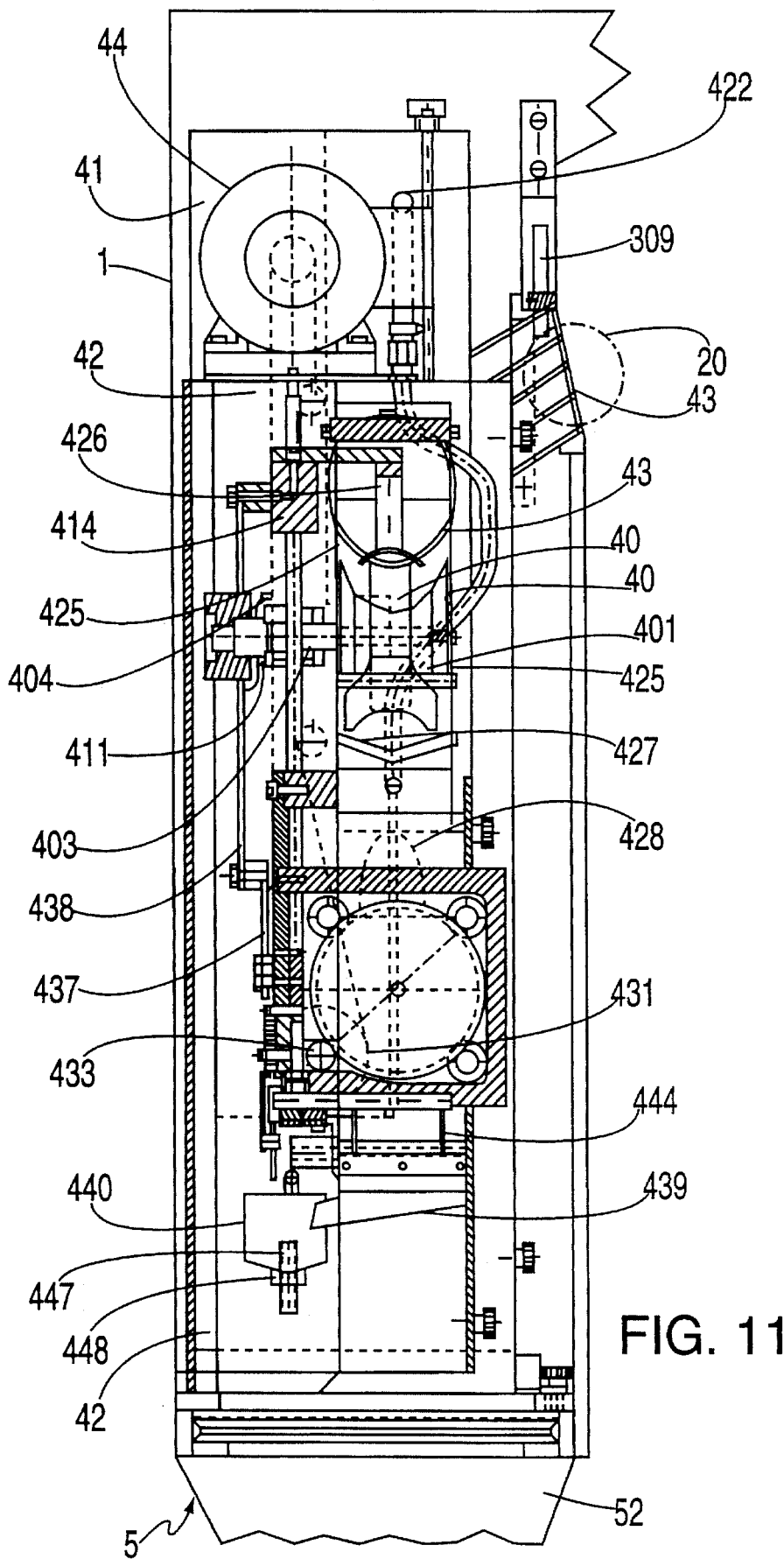
FIG. 11 is a sectional view along the line 83 of FIG. 10, which also shows the central section of the support of the rotary shaft of the rotary portioner 40.

With respect to the rotary portioner 40, the pieces of fruit 20 are delivered by the inclinable and turnable cup 30 to the chute 43, from where they fall to the bucket 402 which, upon the rotation of the bucket wheel 401, assumes the receiving position (FIG. 10).

Figure 20:
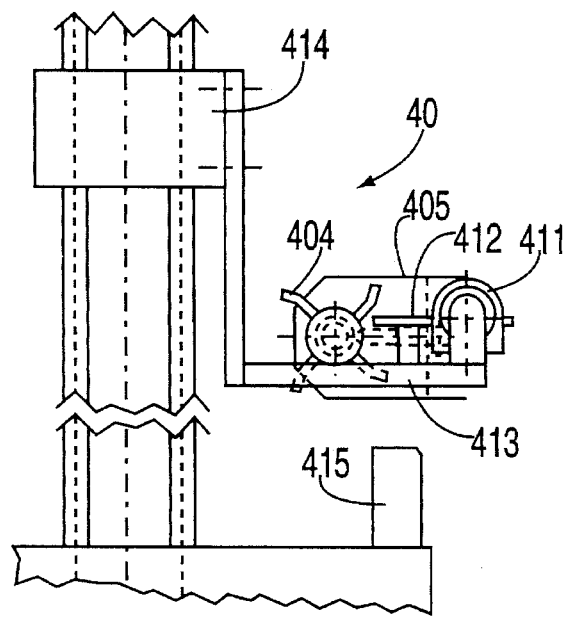
Figure 21:
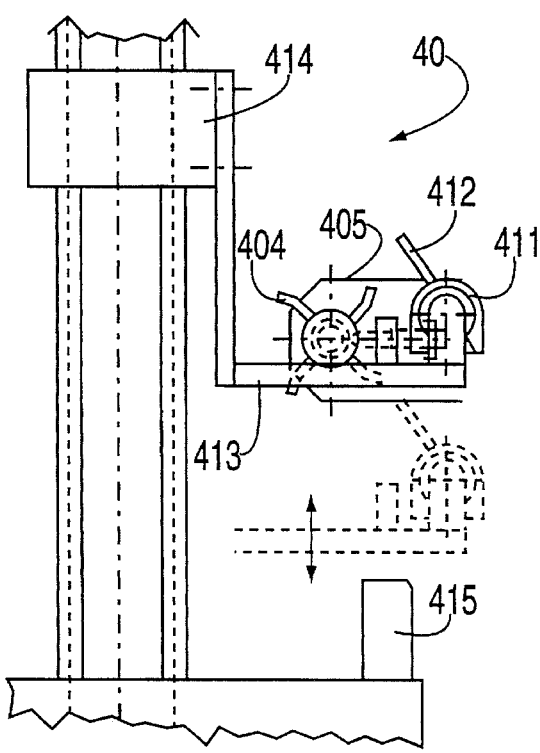

The bucket wheel 401 is installed in the anchoring 405 and its rotation is produced in synchronism by the action on the vane of the turnstile 404 (FIG. 10 and 20) of the rotary pallet 412 which, together with the electromagnet 411 for the rotary blocking of said pallet travels on the support 413 which is carried along vertically by the carriage 414, in synchronism with the rest of the movements (cutting, squeezing, delivery of waste) of the operating cycle.

Figure 18:
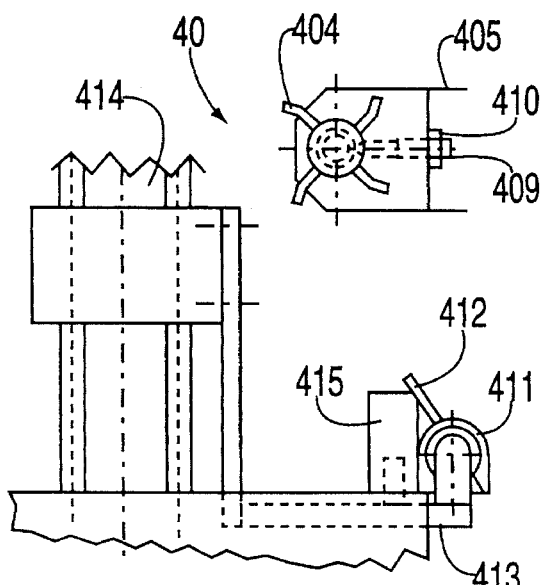
FIG. 18 to 21 are diagrammatic showings which, neglecting the bucket wheel 401, illustrate the operating action of the rotary portioner 40.
Figure 19:
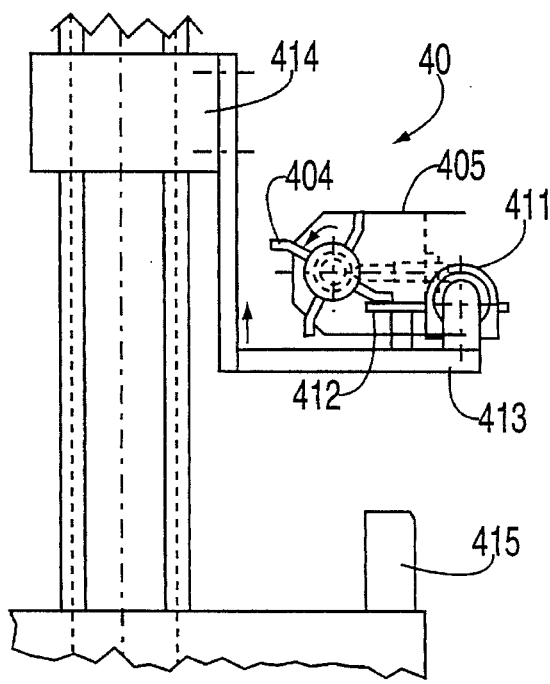

The actuating of the portioner 40 is illustrated diagrammatically in FIG. 18 to 21. The cycle commences in the lower position of the support 413, where the static stop 415 produces the turned position of the pallet 412 (FIG. 18). Upon the start of the ascent, if the electromagnet 411 does not receive the blocking instruction from the control module 7, then the pallet 412 regains its horizontal position and, in the final portion of its ascent, interacts with the corresponding vane of the turnstile 404, and the latter turn driving with it the bucket wheel 410 which delivers a piece of fruit to the cutting means, precisely when the highest point of the descending cutting path coincides. On the other hand, if the electromagnet 411 receives said blocking instruction, then the pallet 412 ascends in the turned oblique position (FIG. 21) and does not interact with said turnstile 404, it then reversing and descending to the initial position (FIG. 18) where it receives the unblocking instruction; this empty ascending/descending travel permits the discharge of the waste last squeezed for its elimination through the crusher module 5; and the blocking instruction which precedes this empty travel is produced by the control system 7 once it receives the signal that the pieces of fruit 20 necessary for a serving portion have been squeezed, which signal is produced after the counting microswitch 416 is actuated by the angle bar 417 which travels in synchronism with said support 413.

Said chute 43 being completely full and the sensor 309 detecting that there are no more pieces of fruit 20 to be delivered by the feed module 3, the control system orders the feed module 3 to effect a new supply run, while the portioning of said pieces of fruit 20 continues waiting, whereby the machine will operate without interruption and without waiting times.

The general configuration, known per se, of the feed module 3 is that it comprises a guide column fastened vertically to the cabinet frame 1 and along which there moves a carriage 313 bearing the corresponding inclinable and turnable cup 30 which is intended to receive the pieces of fruit 20 from the storage module 2, effect a transverse turning, and transport them to the upper dead center of the ascending/descending travel where, being inclined longitudinally, it drops them into the inlet of the squeezer module 4.

A special feature of the feed module 3, resides in the construction of the means which take over the pieces of fruit 20, the active means for the turning of the cup 30, the implementation of sensor and operational control actuator means in combination with a programmable controller system; and the construction of the guide means for the vertical operative displacement.

The means taking over the pieces of fruit 20 are the scoops 33 which are provided with the rotary roller 34 and which preferably are formed by a centrally relieved bordering and formed of a rod. These scoops 33 are dimensioned to pass between the pair of pins 24 which retain the pieces of fruit 20 which occupy the first (or lowest) positions on each tray 21 of said storage module 2.

The active means for the turning of the cup 30 consist of a first electromagnet 37 which is activated by any of the first sensors 35 disposed individually on said scoops 33 when they are actuated by the passage of the pieces of fruit 20, such that any said first sensor 35 can activate, the first electromagnet 37 which assures that normal operation will take place even when, as a result of any abnormality, a single piece of fruit 20 has remained on one of the trays 21.

In addition to said first sensors 35 and turning electromagnet 37, the sensors and implementary actuators in coordination with the programmable controller system consist of a second electromagnet 38 which blocks the horizontal position of the cup 30; a second sensor 39 which senses the condition of 'cup 30 turned'; a third sensor 304 for the rotary unblocking of the cup 30; a fourth sensor 305 which senses the highest position (upper dead center) of the operating travel of the cup 30; a fifth sensor 306 which senses the position of the cup 30 at the lower dead center; a sixth sensor 307 which senses that a piece of fruit 20 from the previous cycle remains in the cup 30, being at the lower dead center to commence a new operating cycle; a seventh sensor 308 for actuation of said turning electromagnet 37 when said sixth sensor 307 is activated; an eighth sensor 309 which detects the presence or absence of pieces of fruit 20 in correspondence with the lower end of the cup 30 when the latter is inclined in its upper dead center.

The particular construction of said guide means of the feed module 3 comprises a guide column 31 which is formed by a rim 310 which is removably fastened to the cabinet frame 1 and which is provided with two rails 311 each having a circular head which is operatively surrounded by corresponding reciprocal grooves provided in a shoe 312 associated with the carriage 313 supporting said inclinable and turnable cup 30.

Furthermore, the means producing the inclination of the cup 30 at the highest point of its ascending course are mechanical means comprising, at the moveable part of the cup 30 and projecting on the bottom and back thereof, a stop member 36 which, on its vertical ascent, interacts with another stop member 301 anchored to the cabinet frame 1 of the machine with a suitable precedence before the cup 30 reaches said maximum point. The means for the turning up of the cup 30 are mechanical means consisting of a stop member 302 which is fastened to the cabinet-frame 1 and which interacts when the cup 30 reaches the lower dead center of its vertical operating course.

Figure 23:
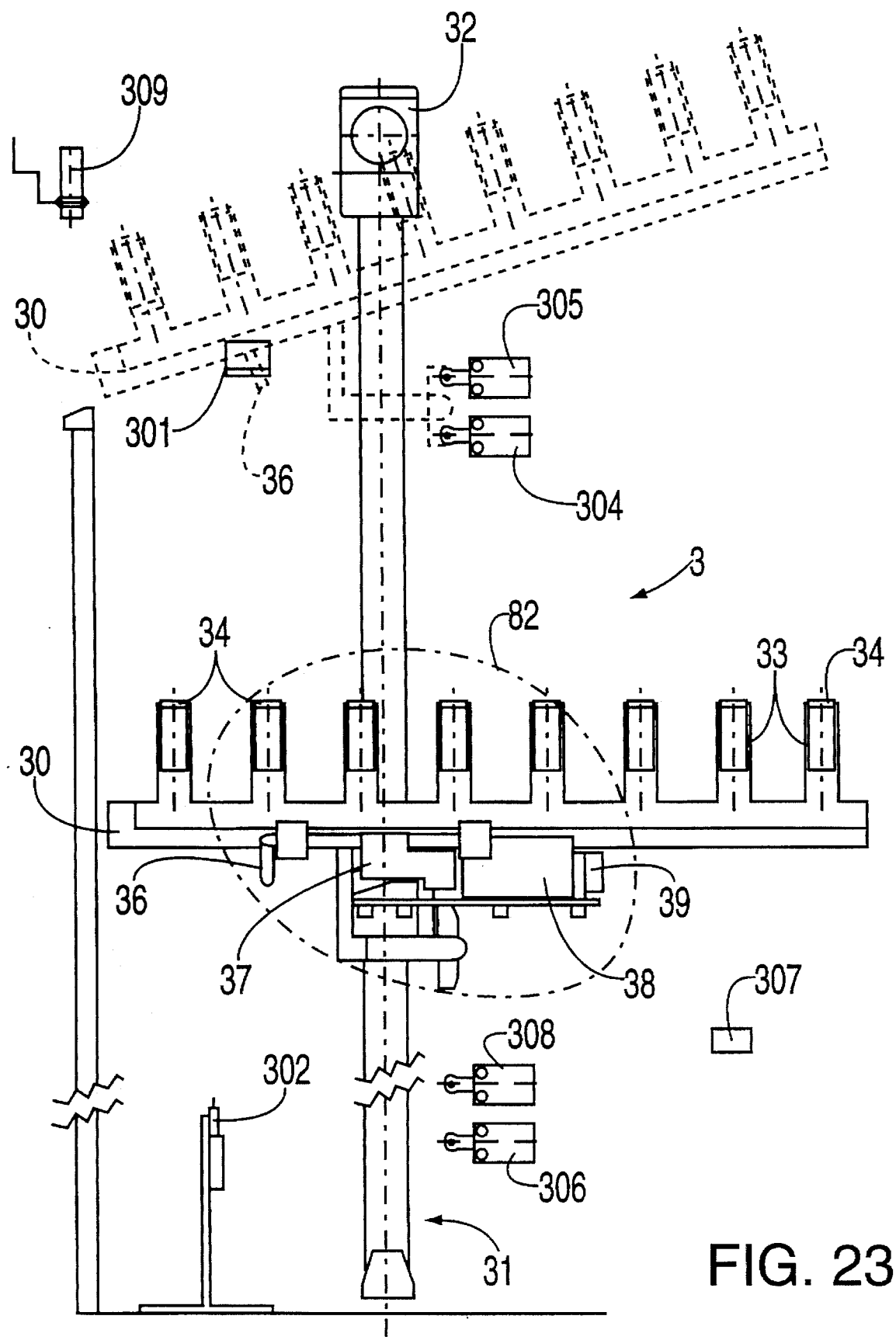
FIG. 23 shows the feed module 3 on a larger scale, with diagrammatic showing of the different sensors and actuators of the operational control.
Figure 24:
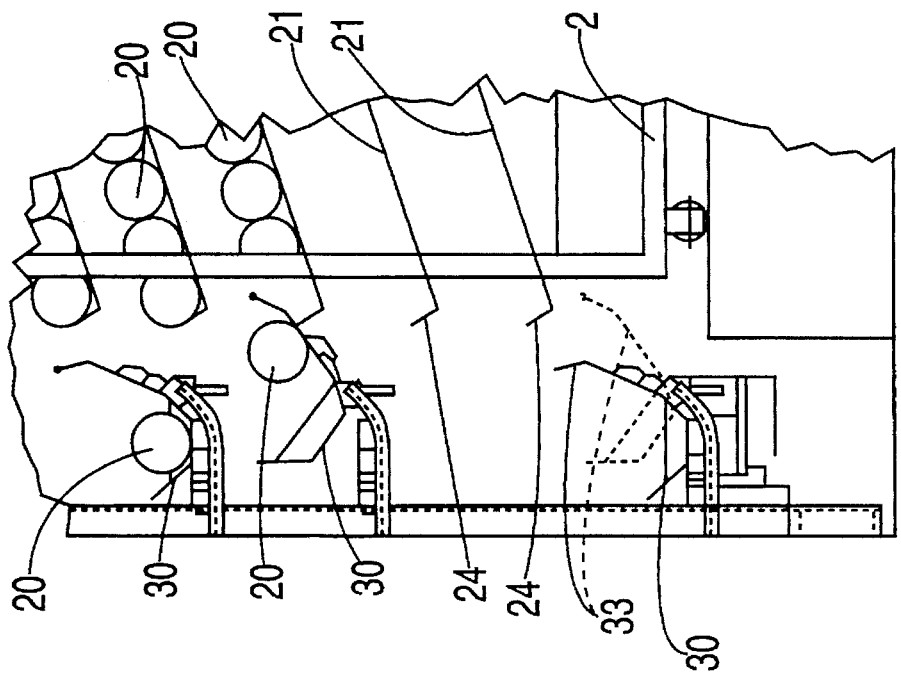
FIG. 24 is a partial view on a larger scale of FIG. 2, which shows illustrative operating positions of the operation of the receiving of the pieces of fruit 20.
Figure 22:
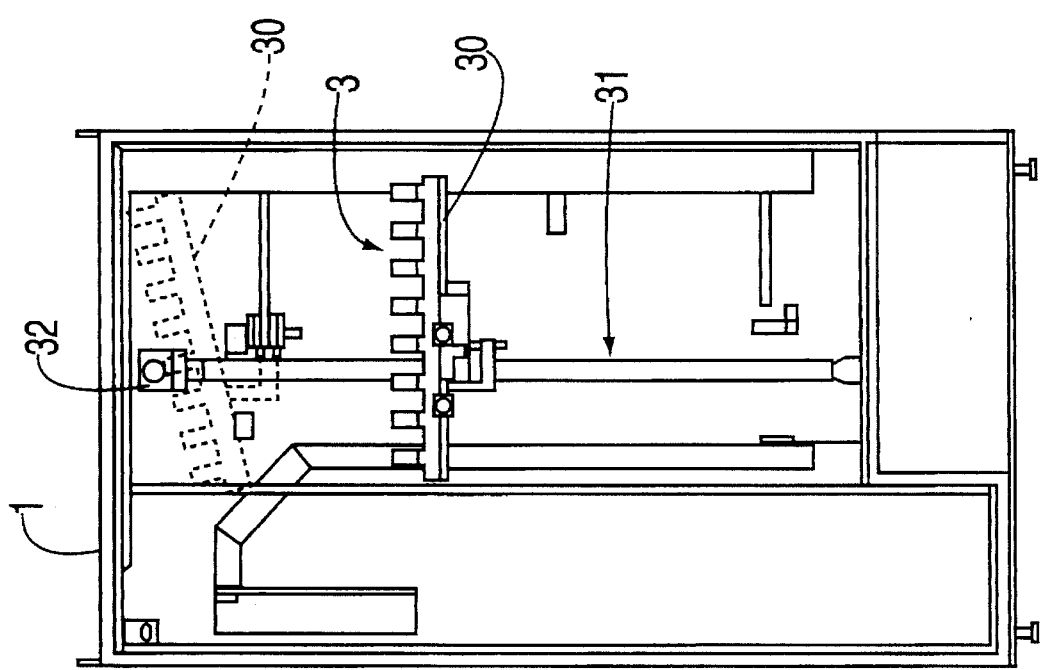
FIG. 22 is a view in front elevation like FIG. 1, but showing tge cabinet frame 1 empty, except for the feed module 3.
Figure 25:
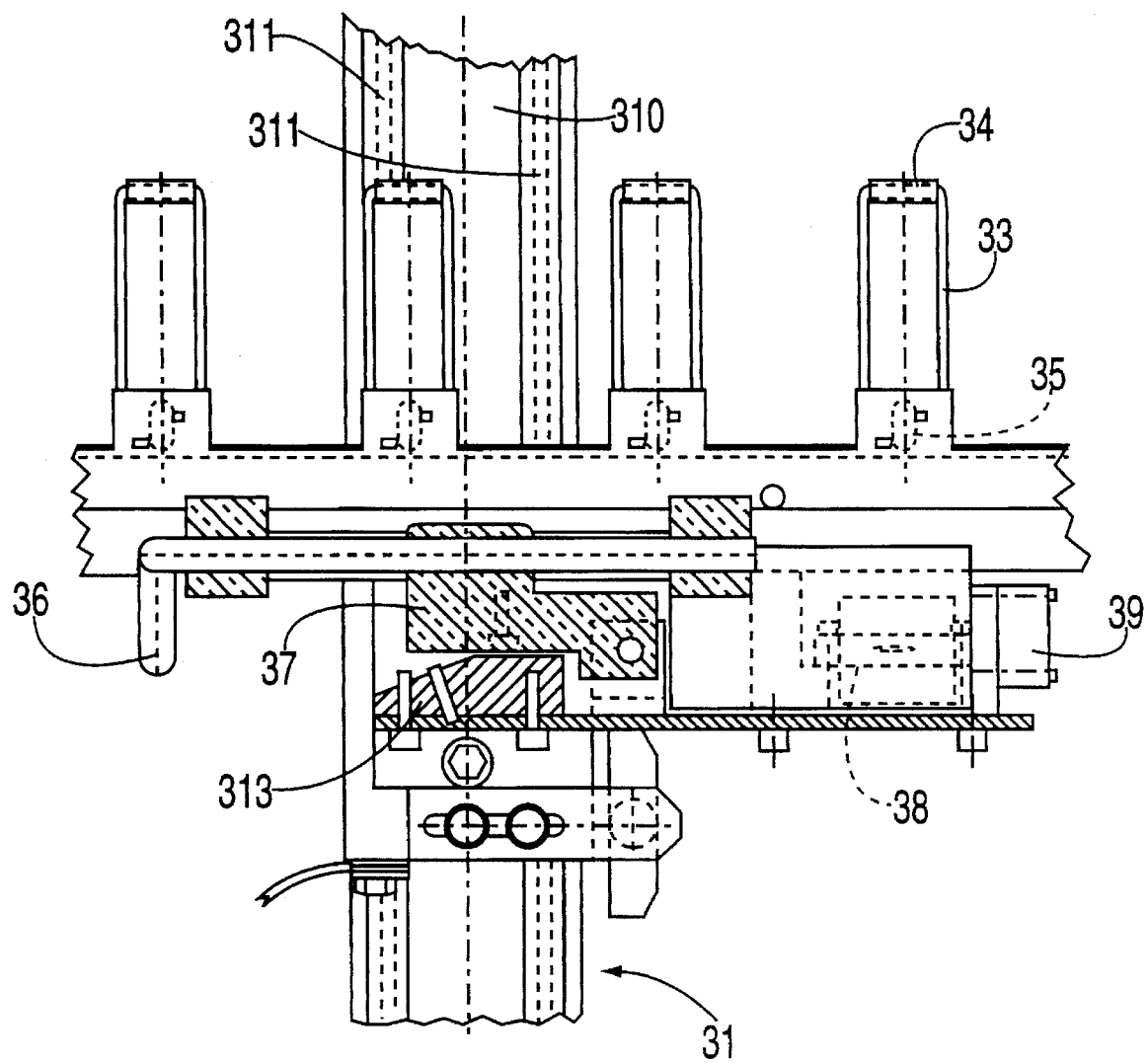
FIG. 25 shows on a large scale the detail 82 encircled in FIG. 23 and which is shown partially in section and with the inclinable and turnable cup 30 in unturned position.
Figure 27:
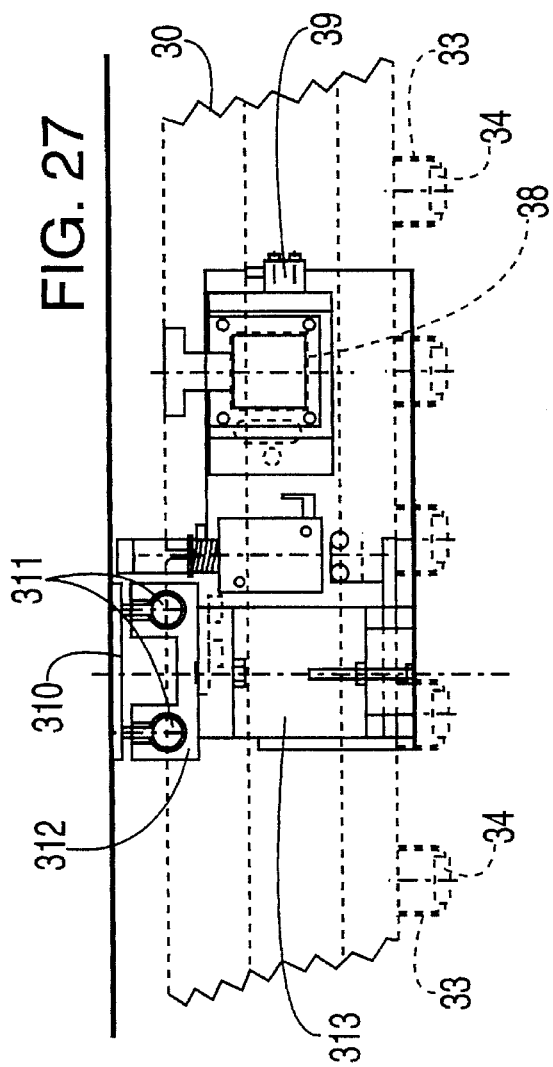
FIG. 27 shows the plan view corresponding to FIG. 25, but showing the cup 30 diagrammatically in dashed line.
Figure 26:
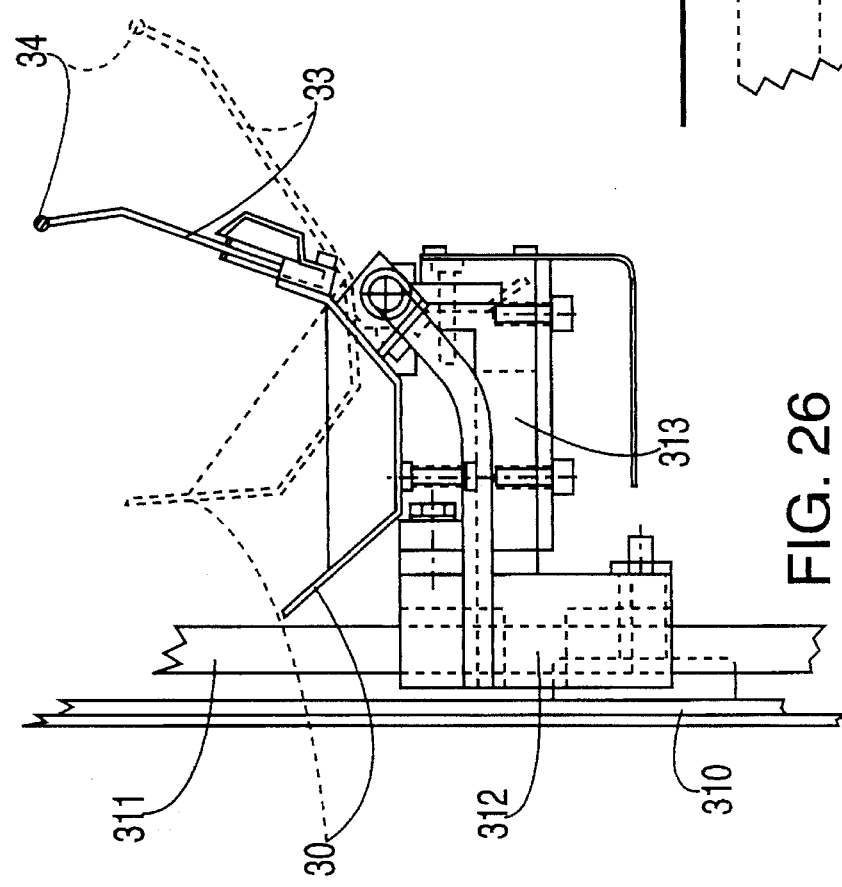
FIG. 26 shows, without cross section, the side elevation corresponding to FIG. 25, showing the unturned position in dashed line and the turned position in solid line.
Figure 29:
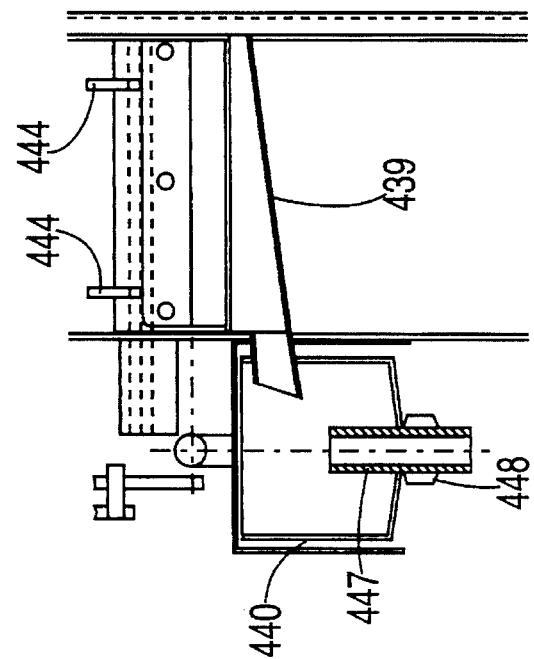
FIG. 29 is a view which essentially corresponds to the section line 85 shown in FIG. 28.
Figure 28:
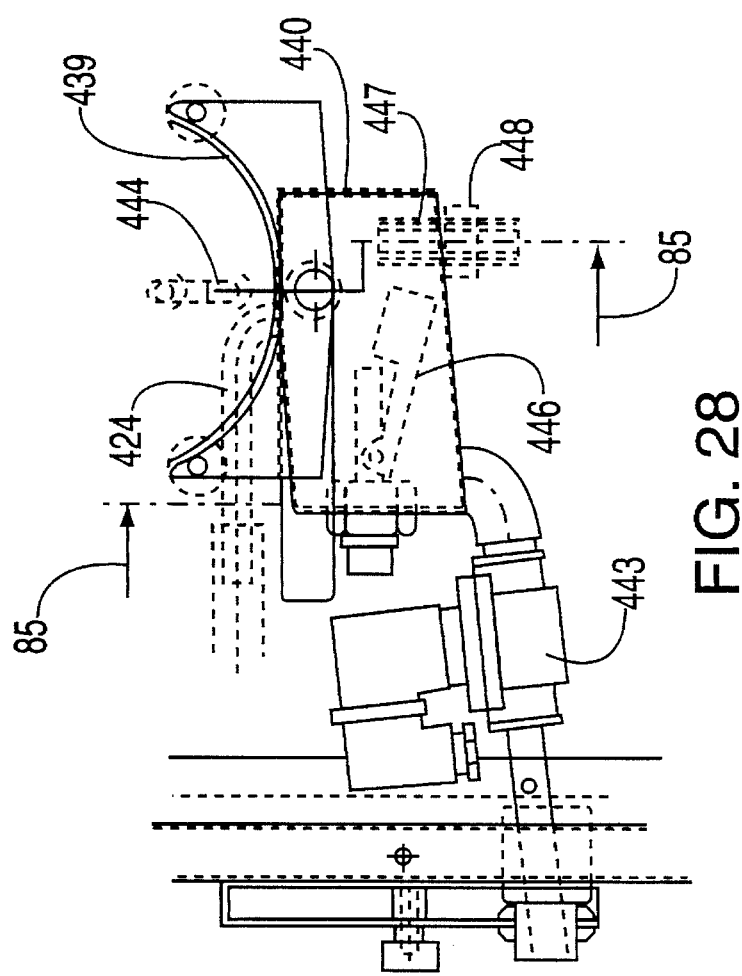
FIG. 28 gives an enlarged view which, with respect to the invention, corresponds to the detail 84 which is circled in FIG. 10.

In order to explain the operation, it is assumed that the cup 30 is in the lower dead center (lower position in FIG. 24) and in non-turned position (shown in dashed line). Upon receipt of a command to start an operating cycle, before commencing ascent, a short period of time is waited in order for the sixth sensor 307 to verify whether any piece of fruit 20 from the previous cycle is present in the cup 30; the travel is started and, if, as is the usual case, the scanning by the sixth sensor 307 has proven negative, the ascent continues until the scoops 33 take over (intermediate position of FIG. 24) the first row of pieces of fruit 20 from the first tray 21 which is occupied (logically, the storage 2 empties from the bottom of the top); the full access of the pieces of fruit onto the scoops 33 is favored by the rotary rollers 37 and results in activating of the first sensors 35 which, in their turn, activate the turning electromagnet 37, with the result of causing the turning of the cup 30 to the position shown at the top in FIG. 24, it being maintained in this position until reaching the upper dead center; shortly before reaching this point, the third sensor 304 is activated and it, in its turn, activates the second electromagnet 38 which produces the rotary unblocking of the longitudinal inclination of the cup 30 and, as the advance continues, the movable stop 36 interacts with the fixed stop 301 and the cup 30 is inclined until assuming the dashed-line position shown in FIG. 23 in which the upper dead center is already reached and said third sensor 304 and fourth sensor 305 are actuated. Thereupon, the pieces of fruit 20 are delivered to the squeezer module 4 and the eighth sensor 309 takes over the control of this operation in such a manner that if a period of time having passed, it does not detect the presence of a new piece of fruit 20, this is interpreted to mean that the operation has terminated and the descent starts in order to be in position to start a new cycle, while, if it is in position of discharge, the eighth sensor 309 detects that there are not sufficient pieces of fruit 20 for the immediate requirements of the squeezer module 4, then a new collecting cycle starts, as has been explained. On the other hand, if the initial scanning effected by the sixth sensor 307 gives a positive result, the seventh sensor 308 being almost immediately reached, the cup 30 is stopped, the turning electromagnet 37 is actuated, and the normal ascent continues, a run taking place with only that piece of those pieces of fruit 20 which remain stuck from the previous cycle.

When said eighth sensor 309 does not detect any more pieces of fruit 20, the motor 32 is placed in opposite direction of operation and the descent starts, the third sensor 304 is released, the cup returns to the horizontal position which is blocked by the second electromagnet 38, the second sensor 39 is connected, the cup 30 descends horizontal and turned, the lower dead center is reached, the fifth sensor 306 being activated and actuating the fixed stop 302 which produces the turning-up of the cup 30, the starting position being recovered.

A safety routine for the operational control consists therein that if, upon the turning, any piece of fruit 20 comes on the top of another piece preventing movement, when the order for turning from the first sensors 34 arrives and it cannot be carried out, the motor 32 stops and for a short period of time the turning is attempted by again activating the turning electromagnet 37. If the turning and the resulting activation of the second sensor 39 do not take place, another attempt is made as before, and if the result is negative, the motor 32 produces the descent of the cup for a few moments and the ascent is resumed, whereby the pieces of fruit will have been freed and the turning can already be effected and normal operation continued. If this does not occur, there will be several further attempts at turning like the previous ones and if the result continues to be negative, the programmable controller system places the machine out of operation.

Another safety routine consists therein that when the cup 30 reaches said upper operating position without being turned due to the fact that the storage 2 is empty and it has not been able to collect pieces of fruit 20, then the control system activates the turning by means of the turning electromagnet 37 and the cup 30 carries out the turned descent, as though it had borne pieces of fruit 20; when this absence of pieces of fruit 20 persists for a predetermined number of complete runs, the controller system places the machine out of operation.

Another safety mechanism consists in placing the machine out of operation when a predetermined period of time passes after the descent has started without the lower dead center having been reached.

As shown in FIGS. 10, 11, and 28 and 29, the means for collecting the juice produced are a filter grid 439 which is provided with a brush 444 which sweeps over its upper concave receptacle and which pours the already filtered juice into a tank 440 which is provided with a level float 446 and the outlet of which is controlled by the dispensing electromagnet 443. All of which is generically known.

In accordance with the invention, the collecting tank 440 also incorporates an overflow 447 which acts in combination with the float 446, as well as the programmable controller system 7 which orders and controls the time of the opening/closing of the solenoid valve 443 as a function of the signal given off by the float 446, in all cases with references to the dispending of the juice since, as we will see, this solenoid valve 443 can be actuated by other means. Within this control mechanism there is also present a selector for the number of pieces of fruit 20 which, on the average, is required for a portion so that, this number having been squeezed, the controller system 7 measures whether the level has been reached on the float 446 after a period of time sufficient for the juice which was on its way to have been collected. If the level has not been reached, the controller system 7 orders the squeezing of a new piece of fruit 20; when the level is reached, any excess is immediately discharged via the overflow 447 and the controller system 7 wait for a time before opening the solenoid valve 443 in order to make certain that such evacuation has taken place and that the portion served will be of the correct volume and no residuce will remain in the tank 440 which could adulterate a subsequent serving, the entire portion served being always freshly squeezed.

The overflow 447 may consist simply (FIGS. 28 and 29) of a tubular segment which is threaded on the outside through the fixed nut 448 and which, by varying the degree of threading, can modify the overflow level (always in concordance with the float 446) in order establish other amounts of the portion to be served.

I claim:

1. A machine for automatically preparing and dispensing fruit juice from pieces of fruit stored in said machine, said machine comprising:
   (a) a compartmented support cabinet for housing a plurality of removable modules;
   (b) a storage module for storing pieces of fruit in their natural state, said storage module being removably housed in said cabinet;
   (c) a squeezer module for cutting and squeezing juice from said fruit and for holding juice from said fruit, said squeezer module being removably housed in said cabinet;
   (d) a feed module for transferring pieces of fruit from said storage module to said squeezer module, said feed module being removably housed in said cabinet;
   (e) a refrigerating module for cooling pieces of fruit in said storage module and said feed module, said refrigerating module being removably housed in said cabinet; and
   (f) a control module for controlling the operation of the modules in said cabinet, said operational control module being removably housed in said cabinet.

2. The machine of claim 1 wherein said squeezer module comprises an upper compartment in which is housed a motor for providing power to said squeezer module and a lower compartment in which is housed a cutting unit, a squeezing unit and a juice tank, said juice tank being positioned below said squeezing unit and said squeezing unit being positioned below said cutting unit.

3. The machine of claim 2 wherein said squeezer module further comprises an internal washing unit for removing residue pulp and juice from said cutting unit and said squeezing unit.

4. The machine of claim 2 wherein said squeezer module further comprises a rotary bucket carousel portioner for transferring pieces of fruit one by one to said cutting unit.

5. The machine of claim 2 wherein said juice tank comprises a level measuring device to determine when said juice tank has a serving portion of juice therein and an overflow device for discharging excess juice from said juice tank.

6. The machine of claim 1 further comprising a crusher module for crushing said fruit after said juice has been removed from said fruit by said squeezer module, said crusher module being positioned below said squeezer module, said crusher module being removably housed in said cabinet.

7. The machine of claim 6 wherein
   (a) said cabinet frame is divided into three compartments,
      (1) a lateral compartment which has a depth that extends from the front of said cabinet to the rear of said cabinet, a width that extends from one side of said cabinet to a vertical partition wall in said cabinet, and a height which extends from the bottom of said cabinet to the top of said cabinet, said vertical partition wall extending from the front of said cabinet to the rear of said cabinet and from the top of said cabinet to the bottom of said cabinet, said lateral compartment housing said squeezer module and said crusher module;
      (2) a refrigerating compartment which has a depth that extends from the front of said cabinet to the rear of said cabinet, a width that extends from said partition wall to the other side of said cabinet and a height which extends from the top of said cabinet down to a horizontal partition wall, said horizontal partition wall extending from the front of said cabinet to the rear of said cabinet and from said vertical partition wall to said other cabinet wall, said refrigerating compartment housing said feed module and said storage module; and
      (3) a machinery compartment which has a depth that extends from the front of said cabinet to the rear of said cabinet, a width that extends from the other wall of said cabinet to said vertical partition wall of said cabinet and a height that extends from the bottom of said cabinet up to said horizontal partition wall, said machinery compartment having a ventilation grid in the rear of said cabinet, said machinery compartment housing said refrigerating module and said operational control module.

8. The machine of claim 4 wherein said cabinet has an inner insulating door mounted on the front of said cabinet and an outer door which is mounted on the front of said cabinet and covers said inner insulating door when said inner door and outer door are closed, said inner door and said outer door providing access to said modules housed in said cabinet.

9. The machine of claim 3 wherein said internal washing unit comprises:
   (a) a pair of showers positioned in said lower compartment of said squeezer module, said pair of showers directing a stream of water downward towards said cutting unit and said squeezing unit for washing residue pulp and juice from said cutting unit and said squeezing unit;
   (b) a hose connected directly to said juice tank for directing water into said juice tank for washing residue pulp and juice from said juice tank; and
   (c) a water distributor which is connected at one end to said pair of showers and said hose, and at the other end to an inlet, said water distributor supplying water from said inlet to said pair of showers and said hose.

10. The machine of claim 6 wherein said crusher module comprises:
   (a) an upper hopper for receiving said fruit after juice has been removed from said fruit by said squeezer module;
   (b) a crusher body positioned below said upper hopper, said crusher body receiving said fruit from said upper hopper and crushing the fruit from said upper hopper; and
   (c) a discharge outlet for discharging the crushed fruit from said crusher body into a general sewage system.

11. The machine of claim 3 wherein said internal washing unit is controlled by said operational control module and said internal washing unit is activated either automatically during an operating cycle of the machine when it is dispensing fruit juice or manually for maintenance of the machine.

12. The machine of claim 6 wherein said crushing module is controlled by said control module such that said squeezer module operates at the same time as said crusher module and said crusher module stops after a liquid stream of crushed fruit has left said crusher module.

13. The machine of claim 4 wherein said rotary bucket carousel portioner comprises:

(a) a multi-bucket wheel, each bucket of said multi-bucket wheel suitable for holding a piece of fruit; said multi-bucket wheel rotatable about a first horizontal shaft, said first horizontal shaft fixed with respect to said squeezer module;

(b) a turnstile mounted on said first horizontal shaft, said turnstile having vanes which correspond in number and position to each bucket of said multi-bucket wheel; and (c) a displaceable pallet which rotates on a second horizontal shaft to cause the vanes of said turnstile to rotate which in turn causes said multi-bucket wheel to rotate thereby causing pieces of fruit to be transferred one by one to said cutting unit.

14. The machine of claim 13 wherein said displaceable pallet comprises a means for selectively inhibiting the rotation of said pallet about said second horizontal shaft.

15. The machine of claim 14 wherein said means for selectively inhibiting the rotation of said pallet is controlled by said controller module.

16. The machine of claim 13 wherein said first horizontal shaft has notches therein for partially receiving a ball, said ball biased by a spring which has a means to adjust the tension in said spring.

17. The machine of claim 13 wherein said squeezer module further comprises a chute for transferring pieces of fruit from said feed module to said rotary bucket carousel portioner, said chute having a sensor therein for detecting the absence of a piece of fruit and producing a signal which when processed by said control module causes said feed module to transport a piece of fruit from said storage module to said chute.

18. The machine according to claim 1 wherein said storage module comprises multi-level storage trays which are inclined downward, and a pair of pins positioned at the bottom of each of said trays which retains the first piece of fruit in descending alignment in said trays.

19. The machine of claim 18 wherein said feed module comprises:

an inclinable and turnable cup;

a receiving scoop attached to one edge of said cup for moving pieces of fruit from said storage module to said cup; and a rotary roller installed at the edge of said receiving scoop, said rotary roller having a width smaller than the separation between said pair of pins of said storage trays.

20. The machine of claim 19 wherein said feeder module further comprises sensors and actuator means connected to said control module, said sensor and actuator means comprises:

(a) a first sensor on each of said receiving scoops, which is actuated by the passage of the pieces of fruit;

(b) a first electromagnet for turning said cup, which is activated by the passage of fruit on said first sensor;

(c) a second sensor which senses the turned state of the cup;

(d) a second electromagnet which determines and blocks the horizontal position of the cup;

(e) a third sensor which activates on said second electromagnet the unblocking state of the horizontal position of the cup;

(f) a fourth sensor for the 'cup up' position;

(g) a fifth sensor for the 'cup down' position;

(h) a sixth sensor which, within a timed period of time prior to the start of the ascending path examines whether any piece of fruit from the preceding operating cycle is caught in the cup;

(i) a seventh sensor which activates said turning electromagnet when, in its turn, it is actuated by the activated state of said sixth sensor; and (j) an eighth sensor which is located in operating correspondence with the lower end of the inclined 'cup up' position.

21. The machine of claim 20 wherein said feed module further comprises means for turning said cup downward when said means comprising a first stop member is affixed to said cup and movable with said cup and a second stop member is affixed to said cabinet.

22. The machine of claim 20 wherein said feed module further comprises a means for turning said cup upwards, said means comprising a third stop member which is affixed to said cabinet frame and which interacts with said cup when said cup reaches the lower dead center of its vertical operating run.

23. The machine of claim 20 wherein said feed module comprises a guide column affixed to said cabinet frame; two parallel rails attached to said guide column; a shoe which rides on said two rails; a carriage attached to said shoe, said cup attached to said carriage.

24. The machine of claim 2 wherein said juice tank comprises:

a filter grid for filtering the juice received from said squeezing unit;

a collecting tank for receiving juice filtered by said filter grid, said collecting tank positioned below said filter grid;

a float attached to said collection tank for measuring the level of the juice collected in said collecting tank, said float being adjustable;

an overflow for discharging excess juice from said collecting tank, said overflow being adjustable; and a dispensing solenoid valve for dispensing juice form said collecting tank.

25. The machine of claim 24 wherein said operational controlling module is programmed to require a set number of pieces of fruit to be squeezed by said squeezing unit before verifying by means of said float that a portion of juice is in said collecting tank; and opening said dispensing solenoid valve if a portion has been established, and if a portion has not been established instructing the squeezing of more pieces of fruit.

26. The machine of claim 25 wherein said overflow comprises a threaded tubular segment which screws into the bottom of said juice tank thereby allowing said overflow to be adjustable.

* * * * *